(12) United States Patent
Hwang et al.

(10) Patent No.: US 10,345,901 B2
(45) Date of Patent: Jul. 9, 2019

(54) SOUND OUTPUTTING APPARATUS, ELECTRONIC APPARATUS, AND CONTROL METHOD THEREOF

(71) Applicant: Samsung Electronics Co., Ltd., Suwon-si (KR)

(72) Inventors: Tae-ho Hwang, Seongnam-si (KR); Mi-young Kim, Suwon-si (KR); Min-su Hwangbo, Suwon-si (KR); Jong-youb Ryu, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 111 days.

(21) Appl. No.: 15/143,091

(22) Filed: Apr. 29, 2016

(65) Prior Publication Data
US 2016/0320840 A1    Nov. 3, 2016

(30) Foreign Application Priority Data

Apr. 30, 2015  (KR) .................. 10-2015-0061905
Apr. 28, 2016  (KR) .................. 10-2016-0051960

(51) Int. Cl.
*G06F 17/00*   (2019.01)
*G06F 3/01*    (2006.01)
(Continued)

(52) U.S. Cl.
CPC .............. *G06F 3/015* (2013.01); *G06F 3/165* (2013.01); *H04R 1/1041* (2013.01);
(Continued)

(58) Field of Classification Search
CPC ....... G06F 3/015; G06F 3/165; H04R 1/1041; H04R 1/1008; H04R 1/1016; H04R 3/04;
(Continued)

(56) References Cited

U.S. PATENT DOCUMENTS 4,275,744 A   6/1981  Thornton et al.
5,282,475 A   2/1994  Urbach et al.
(Continued)

FOREIGN PATENT DOCUMENTS

CN   103052012 A   4/2013
CN   104783817     7/2015
(Continued)

OTHER PUBLICATIONS

International Search Report corresponding to International Application No. PCT/KR2016/004565, dated Jul. 29, 2016.
(Continued)

*Primary Examiner* — Fan S Tsang
*Assistant Examiner* — David Siegel
(74) *Attorney, Agent, or Firm* — Nixon & Vanderhye P.C.

(57) ABSTRACT

A sound outputting apparatus which includes a communicator to communicate with an electronic apparatus and receive first audio data, an output module to output the first audio data received, and to output second audio data, which is modified data of the first audio data, a sensor to detect brainwave data of a user, and a processor to control so that the brainwave data of the user detected through the sensor is transmitted to the electronic apparatus through the communicator, and so that the second audio data is received from the electronic apparatus.

9 Claims, 36 Drawing Sheets

(51) Int. Cl.
   *G06F 3/16* (2006.01)
   *H04R 1/10* (2006.01)
   *H04R 3/04* (2006.01)
   *H04R 5/04* (2006.01)
(52) U.S. Cl.
   CPC .......... *H04R 1/1008* (2013.01); *H04R 1/1016* (2013.01); *H04R 3/04* (2013.01); *H04R 5/04* (2013.01); *H04R 2205/041* (2013.01); *H04R 2430/01* (2013.01); *H04R 2460/07* (2013.01)
(58) Field of Classification Search
   CPC ................ H04R 5/04; H04R 2205/041; H04R 2430/01; H04R 2460/07
   See application file for complete search history.

(56) References Cited

U.S. PATENT DOCUMENTS

| | | | |
|---|---|---|---|
| 5,471,009 | A | 11/1995 | Oba et al. |
| 5,954,667 | A | 11/1999 | Finkenzeller et al. |
| 5,999,856 | A | 12/1999 | Kennedy |
| 6,475,163 | B1 | 11/2002 | Smits et al. |
| 7,399,282 | B2 | 7/2008 | John et al. |
| 7,594,122 | B2 | 9/2009 | Milgramm et al. |
| 8,177,727 | B2 | 5/2012 | Kwak |
| 8,559,645 | B2 | 10/2013 | Corona-Strauss et al. |
| 8,949,744 | B2 | 2/2015 | Peissig et al. |
| 9,635,469 | B2 | 4/2017 | Lunner et al. |
| 2012/0052905 | A1* | 3/2012 | Lim .................. G06F 3/015 455/550.1 |
| 2013/0101128 | A1* | 4/2013 | Lunner .................. H04R 25/30 381/60 |
| 2013/0338527 | A1 | 12/2013 | Suh et al. |
| 2014/0206323 | A1 | 7/2014 | Scorcioni |
| 2015/0297109 | A1* | 10/2015 | Garten .............. A61B 5/04845 600/544 |
| 2015/0320332 | A1 | 12/2015 | Lee et al. |

FOREIGN PATENT DOCUMENTS

| | | |
|---|---|---|
| CN | 204428043 | 7/2015 |
| JP | 2012183210 | 9/2012 |
| JP | 5219202 | 6/2013 |
| KR | 20120046367 | 5/2012 |
| KR | 10-20120066274 A | 6/2012 |
| KR | 10-2012-0100597 A | 12/2012 |
| KR | 10-2013-0120692 A | 5/2013 |
| KR | 10-1496661 B1 | 2/2015 |

OTHER PUBLICATIONS

Written Opinion of the International Searching Authority corresponding to International Application No. PCT/KR2016/004565, dated Jul. 29, 2016.
Chinese Office Action dated Mar. 27, 2019 for CN Application No. 201680031923.0.
Translation of CN Office Action No. 201680031923.0.

* cited by examiner

SOUND OUTPUTTING APPARATUS, ELECTRONIC APPARATUS, AND CONTROL METHOD THEREOF

RELATED APPLICATION(S)

This application claims priority from Korean Patent Application No. 10-2015-0061905, filed on Apr. 30, 2015 and Korean Patent Application No. 10-2016-0051960, filed on Apr. 28, 2016, in the Korean Intellectual Property Office, the disclosure of which is incorporated herein by reference in its entirety.

BACKGROUND

Devices and methods consistent with what is disclosed herein relate to a sound outputting apparatus, an electronic apparatus, and a control method thereof, and more specifically, to a sound outputting apparatus configured to provide audio, and an electronic apparatus and a control method thereof.

With the strength of the electronic technology development, various types of electronic apparatuses are developed and provided. Specifically, as one example of the electronic products recently used in many cases, the smart phone continues to be developed in recent years.

While the performance of the electronic apparatuses becomes highly qualified, the general trend is that the electronic apparatuses or more specifically, the portable user terminal apparatus outputs previously stored content, or streams the content from an external server and outputs the same.

However, users have the differences in the hearing ability, and should directly control the output state of the contents according to a variety of listening situation for a variety of places. As a result, users cannot be provided with the hearing service optimized for the listening situation.

SUMMARY

Exemplary embodiments of the present disclosure overcome the above disadvantages and other disadvantages not described above. Also, the present disclosure is not required to overcome the disadvantages described above, and an exemplary embodiment of the present inventive concept may not overcome any of the problems described above.

According to an embodiment, a technical objective is to provide a sound outputting apparatus which provides a user-friendly hearing service optimized for a listening situation and a hearing ability of a user by automatically controlling an output state of audio data based on the listening situation and the hearing ability of the user, an electronic apparatus, and a control method thereof.

According to an embodiment, a sound outputting apparatus is provided, which may include a communicator configured to communicate with an electronic apparatus and receive first audio data, an output module configured to output the received first audio data and second audio data, which is modified data of the first audio data, a sensor configured to detect brainwave data of a user, and a processor configured to control so that the brainwave data of the user detected by the sensor is transmitted to the electronic apparatus through the communicator, and so that the second audio data is received from the electronic apparatus.

The electronic apparatus may modify the first audio data into the second audio data according to audio output information based on listening information determined from the brainwave data of the user and a listening situation of the user, and may transmit the second audio data to the sound outputting apparatus.

The audio output information may include information regarding at least one of an equalizer, a volume and a recommended time for continued listening.

When a test signal is received from the electronic apparatus, the processor may output the test signal and transmit the brainwave data responding to the test signal to the electronic apparatus.

According to an embodiment, an electronic apparatus is provided, which may include a sound outputting apparatus, a communicator connected to the sound outputting apparatus, and configured to transmit first audio data to the sound outputting apparatus, a detector configured to detect situation data of a user, and a processor configured to modify the first audio data into second audio data by using audio output information determined correspondingly to brainwave data of the user received from the sound outputting apparatus and the situation data detected, and transmit the second audio data to the sound outputting apparatus.

The audio output information may include information regarding at least one of an equalizer, a volume, and a recommended time for continued listening.

The processor may modify the first audio data into the second audio data by using the audio output information determined correspondingly to listening information of the user based on the brainwave data of the user, and the listening situation of the user based on the situation data of the user.

The listening situation may include at least one of a surrounding environment situation of the user, a body activity situation of the user, and a type of the sound outputting apparatus.

Further, the listening information of the user may include a hearing characteristic of the user and a hearing sensitivity of the user, the hearing characteristic of the user may include an audible range of the user, a hearing level respectively regarding left ear and right ear, and a hearing level per frequency, and the hearing sensitivity of the user may include at least one of an ambient noise sensitivity, a body activity sensitivity, a temperature sensitivity, an audio data sensitivity, and a recognition state sensitivity.

The processor may transmit a test signal to the sound outputting apparatus, and obtain the listening information of the user based on the brainwave data responding to the test signal.

Meanwhile, according to an embodiment, a control method of a sound outputting apparatus for communicating with an electronic apparatus and outputting audio data is provided, which may include receiving first audio data from the electronic apparatus and outputting the first audio data, transmitting brainwave data of a user to the electronic apparatus, and receiving second audio data, which is modified data of the first audio data, from the electronic apparatus and outputting the same in response to the transmitting the brainwave data.

The electronic apparatus may modify the first audio data into the second audio data according to audio output information modified based on listening information determined based on the brainwave data of the user and listening situation of the user, and transmit the second audio data to the sound outputting apparatus.

The audio output information may include information regarding at least one among an equalizer, a volume and a recommended time for continued listening.

When a test signal is received from the electronic apparatus, the transmitting may include outputting the test signal and transmitting the brainwave data responding to the test signal to the electronic apparatus.

Meanwhile, according to an embodiment, a control method of an electronic apparatus for transmitting audio data to a sound outputting apparatus is provided, which may include transmitting first audio data to the sound outputting apparatus, detecting situation data of a user, and modifying the first audio data into second audio data by using audio output information determined correspondingly to brainwave data of a user received from the sound outputting apparatus and the detected situation data of a user, and transmitting the second audio data to the sound outputting apparatus.

The audio output information may include information regarding at least one among an equalizer, a volume and a recommended time for continued listening.

The modifying and the transmitting the second audio data may include modifying the first audio data into the second audio data by using audio output information determined correspondingly to listening information of the user based on the brainwave data of the user and the listening situation of the user based on the situation data of the user.

The listening situation may include at least one regarding a surrounding environment situation of the user, a body activity situation of the user, and a type of the sound outputting apparatus.

The listening information of the user may include a hearing characteristic of the user and a hearing sensitivity of a user, the hearing characteristic of the user may include at least one among an audible range of the user, a hearing level respectively regarding left and right ears, and a hearing level per frequency, and the hearing sensitivity of a user may include at least one among an ambient noise sensitivity, a body activity sensitivity, a temperature sensitivity, an audio data sensitivity, and a recognition state sensitivity.

The control method may additionally include transmitting a test signal to the sound outputting apparatus, and obtaining the listening information of the user based on the brainwave data responding to the test signal.

Meanwhile, according to an embodiment, an electronic system is provided, which may include a sound outputting apparatus configured to communicate with the electronic apparatus, receive first audio data and output the same, detect brainwave data of a user, and transmit the detected brainwave data of the user to the electronic apparatus, and an electronic apparatus configured to transmit second audio data, which is modified data of the first audio data, by using audio output information determined correspondingly to brainwave data of the user received from the sound outputting apparatus and the detected situation data of the user to the sound outputting apparatus.

According to the various embodiments described above, a user can be provided with the user friendly hearing experiences optimized for the current listening situation.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Figure 1:
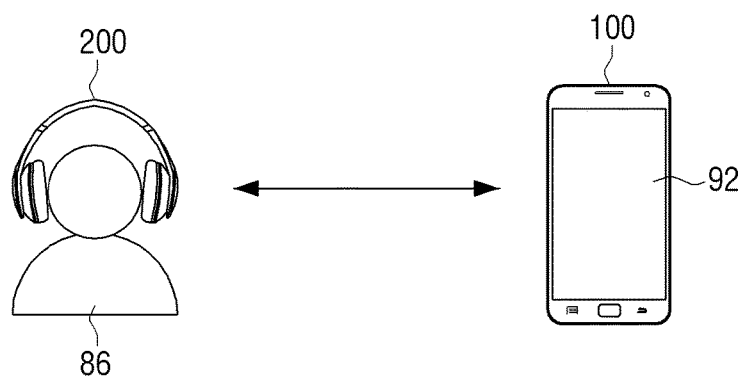
FIG. 1 is a diagram schematically illustrating an electronic system according to an embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the disclosure with unnecessary detail.

Referring to the attached drawings, the disclosure will be described in detail below.

FIG. 1 is a schematic diagram of an electronic system 50 according to an embodiment.

Referring to FIG. 1, the electronic system 50 according to an embodiment includes an electronic apparatus 100 and a sound outputting apparatus 200.

The electronic apparatus 100 may reproduce audio data, and transmit to the sound outputting apparatus 200 connected to the electronic apparatus 100 wiredly or wirelessly.

In this case, the electronic apparatus 100 may be implemented as smart phone, tablet, smart watch, smart glasses, smart gear, and so on.

Herein, the audio data may be various types of voice or sound contents such as music, video, radio broadcast, ground wave broadcast, and voice signal of a counterpart user during a call. The audio data may be previously downloaded in the electronic apparatus 100 or provided by being externally received or streamed at real time.

Specifically, the electronic apparatus 100 may control an output state of the audio data with audio output information.

Herein, the audio output information may include information for optimized sound under a listening situation, and information regarding a hearing ability of a user 86 who listens to sounds indicative of the audio data. For example, the audio output information may include information regarding an equalizer, a volume and a recommended time for continued listening.

For example, when a user listens to sounds indicative of the audio data while exercising at a gym, the electronic apparatus 100 may output sounds indicative of the audio data with the equalizer, the volume, and the recommended time optimized for continued listening by considering the gym (situation) where the user is exercising, the exercising (situation), and the hearing ability of the user.

Meanwhile, the sound outputting apparatus 200 may be connected to the electronic apparatus 100 wiredly or wirelessly to receive the audio data from the electronic apparatus 100 and output the audio data, for example, in the form of sounds.

In this case, the sound outputting apparatus 200 may be implemented as various types of devices which can receive the audio data from the electronic apparatus 100 and output the audio data, for example, in the form of sounds.

For example, the sound outputting apparatus 200 may be implemented as wearable apparatuses that can be worn by the user 86 such as ear phone, head phone, bone conduction ear phone/head phone, and hearing aid, or other various types of apparatuses such as speaker, sound bar, and home theater.

Figure 2A:
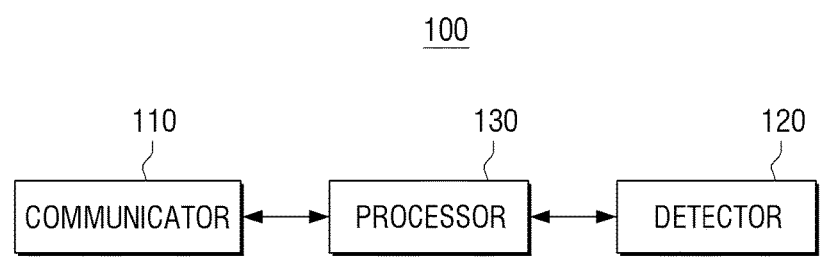
FIG. 2A is a block diagram provided to explain constitution of an electronic apparatus according to an embodiment.

FIG. 2A is a block diagram provided to explain constitution of the electronic apparatus 100 of FIG. 1 according to an embodiment.

Referring to FIG. 2A, the electronic apparatus 100 according to an embodiment includes a communicator 110, a detector 120, and a processor 130.

The communicator 110 may communicate with the sound outputting apparatus 200. Specifically, the communicator 110 may communicate with the sound outputting apparatus 200, and transmit the audio data reproduced in the electronic apparatus 100 to the sound outputting apparatus 200.

In this case, the communicator 110 may communicate with the sound outputting apparatus 200 according to various methods.

For example, the communicator 110 may communicate with the sound outputting apparatus 200 through various wire and/or wireless communication methods such as Bluetooth (BT), Wireless Fidelity (Wi-Fi), ZigBee, Infrared (IR), Serial Interface, universal serial bus (USB), and wire cable.

The detector 120 may detect situation data of a user. Herein, the situation data may include the data used for determining the listening situation of a user who hears the sounds indicative of the audio data through the sound outputting apparatus 200.

Meanwhile, the listening situation of a user may include at least one of the surrounding environment situation, a user's body activity situation, and a type of the sound outputting apparatus 200.

For example, the listening situation of a user may include 1) information related with a listening place where the user listens to the sounds indicative of the audio data through the sound outputting apparatus 200, such as whether the user is in indoors, outdoors, in a car, whether there is ambient noise, what surrounding weather is, and the like, 2) information related to actions performed while listening to the sounds indicative of the audio data, such as currently walking, exercising, sleeping, reading, mediating, talking, and (video) calling, 3) information related to the audio data such as what type of the audio data is heard, and 4) information related to the type of the sound outputting apparatus 200 such as whether the sound outputting apparatus 200 is earphone, headphone, or speaker.

For the above, the detector 120 may detect the situation data of the user by using various types of sensors.

For example, the detector 120 may sense the situation data to determine a body condition of the user listening to the sounds indicative of the audio data via a body composition sensor such as heart rate, muscle activity degree, breathing quantity, blood oxygen level, body temperature, calorie consumption amount, face, voice, and time.

Further, the detector 120 may sense the data to determine the ambient noise while a user listens to the sounds indicative of the audio data, the place where a user listens to the sounds indicative of the audio data, and the user action performed while listening to the sounds indicative of the audio data via sensors, such as, for example, a gyro sensor, an acceleration sensor, a global positioning system (GPS) sensor, a near field sensor, an illumination sensor, a motion sensor, a touch sensor, a camera, a microphone, and the like.

Furthermore, the detector 120 may obtain the situation data from an external device of the electronic apparatus 100.

For example, the detector 120 may obtain information with respect to the surrounding weather where the user is listening to the sounds indicative of the audio data, what the user is doing, and noise information via one or more of the sensors sensing audio data or via an external server which stores previously recorded situation data.

Meanwhile, the detector 120 may obtain a type of the sound outputting apparatus 200 from the sound outputting apparatus 200.

For example, the communicator 110 of FIG. 1 may receive the information related to the sound outputting apparatus 200 transmitted from the sound outputting apparatus 200 (e.g., manufacturer, model name, product serial number, and ID), and the detector 120 may obtain the type of the sound outputting apparatus 200 from the information received at the communicator 110.

In other embodiments, a user may directly input the type of the sound outputting apparatus 200.

Further, the detector 120 may determine a type of the audio data reproduced in the electronic apparatus 100.

For example, the detector 120 may determine a type of the audio data currently reproduced, i.e., a genre of the audio data based on metadata of the audio data.

The processor 130 may control general operation of the electronic apparatus 100.

The processor 130 may include a micro-computer (micom) or a micom and central processing unit (CPU), a random-access memory (RAM), and a read-only memory (ROM) for operating the electronic apparatus 100.

The processor 130 may control the communicator 110 to transmit the audio data to the sound outputting apparatus 200.

Specifically, the processor 130 may reproduce the audio data stored in the electronic apparatus 100, or streamed externally, and transmit the reproduced audio data to the sound outputting apparatus 200.

Meanwhile, the processor 130 may modify the audio data, which is the first audio data, into second audio data by using audio output information determined correspondingly to brainwave data received from the sound outputting apparatus 200 and the situation data detected by the detector 120 and transmit to the sound outputting apparatus 200. For example, first audio data is modified into second audio data, using audio output information based on brainwave data and situation data transmitted to the sound outputting apparatus. Herein, the brainwave data may be represented by potential differences consecutively recorded or measured between two points on the head 86 of the user 86 of FIG. 1, which may reflect electrical activities of the brain. For example, the brainwave data may include, but is not limited to, data of at least one of a plurality of types such as alpha wave, beta wave, gamma wave based on frequency bandwidths, and delta wave.

Specifically, the processor 130 may modify the first audio data into the second audio data by using the audio output information determined based on the hearing ability of the user 86 derived from the brainwave data and the listening situation based on the situation data of the user 86.

Herein, the first audio data may indicate audio data in which an output state is not modified based on the audio output information, and the second audio data may indicate audio data in which the output state is modified based on the audio output information determined according to at least one of the hearing ability information determined based on the brainwave data and the listening situation determined based on the situation data detected by the detector 120.

Herein, the audio output information may include information regarding at least one of an equalizer, a volume, and a recommended time for continued listening.

For example, the processor 130 may modify at least one of the equalizer, the volume, and the recommended time for continued listening regarding the audio data based on at least one of the hearing ability and the listening situation of a user, and transmit the audio data in which the output state is modified to the sound outputting apparatus 200.

For the above, the electronic apparatus 100 may store the audio output information per listening situation. In this case, the audio output information may be generated by the processor 130 or another external apparatus to be stored in the electronic apparatus 100.

The following will explain an example in which the processor 130 generates the audio output information.

The processor 130 may determine the listening situation of the user 86 of FIG. 1 based on the situation data.

Specifically, the processor 130 may determine the surrounding environment situation (e.g., noise level) of a user listening to the sounds indicative of the audio data, a body activity situation (e.g., exercising), and a type of the sound outputting apparatus 200 based on the situation data obtained from the detector 120. Thus, the processor 130 may determine which body activity the user is engaging, which surrounding environment, and which type of the sound outputting apparatus 200 is used by a user for listening to the sounds indicative of the audio data based on the situation data.

Further, the processor 130 may generate the audio output information per listening situation. Thus, the processor 130 may generate the audio output information per listening situation regarding at least one of the equalizer, the volume, and the recommended time optimized for continued listening sound without damaging the hearing ability of the user 86.

Specifically, the processor 130 may generate the audio output information suitable for the listening situation by using previously defined audio output information generating algorithms.

The audio output information generating algorithms may be algorithms that can generate the audio output information to provide the optimized sound without damaging the hearing ability of the user 86 of FIG. 1 listening to the sounds indicative of the audio data with the hearing sensitivity of the user 86 of FIG. 1 as a variable, when the user having the specific hearing characteristics listens to the sounds indicative of the audio data in the specific listening situation (e.g., when a user listens to the sounds indicative of the audio data with the specific type of the sound outputting apparatus while engaging in the specific body activity in the specific surrounding environment).

Herein, the hearing characteristic may include an audible range of the user 86 of FIG. 1, the hearing level respectively regarding the left and the right ear, and the hearing level per frequency. The processor 130 may obtain the hearing characteristic as audiogram. Specifically, the audiogram indicates the audible range of a user measured by an audiometer, i.e., the minimum hearing level (dB) per frequency. In other words, the audiogram illustrates a hearing characteristic of the user 86.

Thereby, the processor 130 may determine the audible range of a user, the hearing level respectively regarding the left and the right ear and the hearing level per frequency by analyzing the audiogram.

Meanwhile, the hearing characteristic of a user may be previously stored in the electronic apparatus 100. However, the hearing characteristic may also be provided externally and stored in the electronic apparatus 100. For example, a user may measure his hearing characteristic through a program (e.g., a hearing measuring application) provided from the electronic apparatus 100. In this way, the processor 130 may obtain the hearing characteristic of a user by generating a hearing measuring result in the audiogram format. Further, a user may measure his hearing characteristic by visiting a clinic or using a web site. The measured hearing characteristic result may be generated in the audiogram format and transmitted to the electronic apparatus 100 through various devices.

The hearing sensitivity may include at least one of an ambient noise sensitivity, a body activity sensitivity, a temperature sensitivity, an audio data sensitivity and a recognition state sensitivity, and have a numerical value to reflect changes in the ambient noise, the body activity, the temperature, the audio data and the recognition state influence the hearing characteristic of a user. For example, when changes in the body activity influence the hearing characteristic of a user is relatively greater than changes in the ambient noise, a value of the body activity sensitivity may be greater than a value of the ambient noise sensitivity.

However, when information regarding the hearing sensitivity of a user is unavailable, the processor 130 may generate the audio output information per listening situation based on the hearing characteristic of a user and an average hearing characteristic of listeners, i.e., the hearing sensitivity of ordinary people. For the above, the electronic apparatus 100 may previously store the information regarding the hearing sensitivity of ordinary people.

Meanwhile, one example regarding the audio output information generated by using previously defined audio output information generating algorithms with the processor 130 may be shown in following Table I, Table II and Table III.

Specifically, Table I indicates an example of the audio output information suitable for a case when a user having the specific hearing characteristic listens to the sounds indicative of the audio data while engaging in a specific body activity in a specific surrounding environment. Table II and Table III indicate an example of the audio output information suitable for a case when a user listens to the sounds indicative of the audio data through a headphone and a sound bar in the situation of Table I, respectively. In this case, the hearing sensitivity of ordinary people may be used instead of the hearing sensitivity of the user.

TABLE I

Audio Output information

| | |
|---|---|
| Basic start volume level | A |
| Maximum/Minimum volume level | Min = A − 30~Max = A + 50 |
| Volume adjust width per hearing threshold shift | ±3/unit shift |
| Calculating formula for hearing threshold shift amount | −1 × ΔNoise |
| Maximum hearing approved time | 30 min. |
| Frequency 1 amount (e.g., 125 Hz) | (L) CV + 0 \| (R) CV + 1 |
| Frequency 2 amount (e.g., 250 Hz) | (L) CV + 3 \| (R) CV + 5 |
| . | . |
| . | . |
| . | . |
| Frequency N amount (e.g., 4000 Hz) | (L) CV + 8 \| (R) CV + 18 |

TABLE II

Audio Output information for Headphone

| | |
|---|---|
| Basic start volume level | B |
| Maximum/Minimum volume level | Min = B − 20~Max = B + 60 |
| Volume adjust width per hearing threshold shift | ±5/unit shift |
| Calculating formula for hearing threshold shift amount | 1 × k × ΔNoise |
| Maximum hearing approved time | 30 min. |
| Frequency 1 amount (e.g., 125 Hz) | (L) CV + 0 \| (R) CV + 1 |
| Frequency 2 amount (e.g., 250 Hz) | (L) CV + 3 \| (R) CV + 5 |
| . | . |
| . | . |
| . | . |
| Frequency N amount (e.g., 4000 Hz) | (L) CV + 10 \| (R) CV + 20 |

TABLE III

Audio Output information for Sound Bar

| | |
|---|---|
| Basic start volume level | C |
| Maximum/Minimum volume level | Min = C − 10~Max = C + 70 |
| Volume adjust width per hearing threshold shift | ±2/unit shift |

TABLE III-continued

Audio Output information for Sound Bar

| | |
|---|---|
| Calculating formula for hearing threshold shift amount | −1 × m × ΔNoise |
| Maximum hearing approved time | 60 min. |
| Frequency 1 amount (e.g., 125 Hz) | (ch1) CV + 0 . . . \| (chM) CV + 1 |
| Frequency 2 amount (e.g., 250 Hz) | (ch1) CV + 3 . . . \| (chM) CV + 4 |
| . | . |
| . | . |
| . | . |
| Frequency N amount (e.g., 4000 Hz) | (ch1) CV + 8 . . . \| (chM) CV + 12 |

Meanwhile, according to Table I, Table II, and Table III, the basic start volume levels for the type of the sound outputting apparatus 200 may be A, B, and C, respectively, and the maximum/minimum volume level may be defined based on the respective basic start volume levels. Unit shift indicates a number of adjustable volume level units. CV indicates the current volume. CV may include different adjustable volume level units based on the types of the sound outputting apparatus 200. Table I, Table II, and Table III also specify respective maximum approved listening times based on the types of sound outputting apparatus 20. Referring to Table I and Table II, when the sound outputting apparatus 200 has a left channel and a right channel, i.e., two different channels, the frequency amounts may be defined for the two channels. Referring to Table III, when the sound outputting apparatus 200 has M channels, the frequency amounts may be defined respectively for the M channels (ch1 to chM). Further, in Table II and Table III, k and m may be weight value considering the outputting/closing performance of each sound outputting apparatus according to the type of the sound outputting apparatus.

It should be noted that the numerical values listed in Table I, Table II, and Table III are merely exemplary values. Other numerical values may also be used for these and other embodiments.

Further, the processor 130 may generate the audio output information per user. Thus, in view of the fact that the listening information of a user influences the audio output information, the processor 130 may generate the audio output information per listening situation respectively corresponding to a plurality of users using the electronic apparatus 100.

For example, the processor 130 may generate the audio output information per user as shown in Table IV.

TABLE IV

| User | Situation | Audio output information |
|---|---|---|
| User 1 | Hearing situation 1 (Interior + Reading + Headphone) | Audio output information 1 |
| | Hearing situation 2 (Exterior + Exercising + Earphone) | Audio output information 2 |
| | Hearing situation 3 (Exterior + Moving + Headphone) | Audio output information 3 |
| User 2 | Hearing situation 1 | Audio output information 4 |
| | Hearing situation 2 | Audio output information 5 |
| | Hearing situation 3 | Audio output information 6 |

It should be noted that Table IV only lists exemplary values. In other embodiments, the processor 130 may divide the surrounding environment situation by a preset range unit based on the noise level, divide the body activity situation by a preset range unit based on a calorie consumption amount, and generate the audio output information suitable for each range. In some embodiments, for example, the processor 130 may divide the noise level by 30-dB unit such as 0 dB~30 dB and 30 dB~60 dB, and the calorie consumption amount by a 500-calorie unit such as 0~500 calories and 500 calories~1,000 calories, and generate the audio output information suitable for each range. In other embodiments, other preset ranges may be used for the noise level and/or the calorie consumption amount.

Further, the processor 130 may also generate the audio output information with the manufacturer and a model type of the sound outputting apparatus 200 even when the sound outputting apparatuses are similar. For example, when the sound outputting apparatuses are all headphones, the processor 130 may generate the audio output information per manufacturer and model type of the headphones.

Thereby, the processor 130 may generate the audio output information per listening situation.

Meanwhile, the processor 130 may determine the listening situation of a user based on the situation data, and determine the audio output information corresponding to the listening situation determined by the processor 130.

Specifically, the processor 130 may determine the surrounding environment situation (e.g., noise level) of a user listening to the sounds indicative of the audio data, the body activity situation (e.g., exercising), and the type of the sound outputting apparatus 200 based on the situation data obtained through the detector 120. Thus, the processor 130 may determine that a user is engaging in a body activity in a surrounding environment and listens to the sounds indicative of the audio data with a type of the sound outputting apparatus 200, based on the situation data.

Further, the processor 130 may also determine the audio output information corresponding to the listening situation of a user from the audio output information stored in the electronic apparatus 100.

For example, when the processor 130 determines that a user exercises on an exterior area (outdoors) and listens to the sounds indicative of the audio data with an ear phone, the processor 130 may determine the audio output information suitable for a current listening situation of a user from the audio output information stored in the electronic apparatus 100.

In this case, the processor 130 may determine a user based on the identification information of a user (e.g., log-in ID or brainwave data of a user), and obtain the audio output information suitable for the user that has been identified.

Meanwhile, the processor 130 may update the audio output information using the brainwave data of a user received from the sound outputting apparatus 200. Further, the processor 130 may store the updated audio output information in the electronic apparatus 100.

For the above, the processor 130 may control the communicator 110 to transmit a test signal to the sound outputting apparatus 200.

Thereby, when the test signal is received, the user may respond to the test signal, and thus produce brainwave data based on the test signal received. The processor 130 may determine the listening information of the user based on the brainwave data and update the audio output information according to the listening information.

In this case, the processor 130 may perform a series of signal processing such as amplifying the brainwave data received from the sound outputting apparatus 200, filtering (e.g., band pass filtering), re-referencing, and noise cancelling, and obtain the brainwave data from the processed signal. However, when a signal processing function is loaded on the sound outputting apparatus 200, the brainwave data may be received from the sound outputting apparatus 200.

Meanwhile, the listening information includes the hearing characteristic and the hearing sensitivity. Thus, the following will explain an example of a method for determining the hearing characteristic and the hearing sensitivity using the brainwave data.

The processor 130 may determine the hearing characteristic of a user based on the brainwave data of a user responding to the test signal received. In this case, the processor 130 may determine the hearing characteristic of a user per listening situation using the brainwave data of a user received in various listening situations.

For example, the test signal may include signals of gradually lowering intensities for specific frequencies, and a user may generate brainwave data in responding to the test signal of lowering intensities that he can recognize per specific frequency. Thereby, the processor 130 may determine a minimum intensity per frequency that can be recognized by a user based on the brainwave data responding to the test signal, i.e., a minimum audible level.

In some embodiments, the processor 130 may transmit reproduced audio data including a specific frequency component signal as the test signal to the sound outputting apparatus 200. The processor 130 may then determine the minimum audible level at main frequency components based on the brainwave data of a user responding to the main frequency components of the reproduced audio data.

Further, the processor 130 may provide the test signal having frequencies such as 100, 500, 1000, 4000, 8000, and 12000 Hz, or the test signal constituted with a combination of the above-identified frequencies, and measure a hearing-impaired level based on the brainwave data in responding to the test signal (Korczak et al., 2012 Journal of the American Academy of Audiology, "Auditory Steady-State Responses").

In this case, the test signal may be a pure tone, a click sound, a human voice, or music signal that is a combination of the above-identified sounds. The processor 130 may amplify or time-frequency transformation an auditory brainstem response (ABR) generated immediately after a stimulus is provided among auditory evoked potential (AEP) based on the test signal, and determine whether a user is hearing-impaired compared to an average response of an ordinary user at a same or similar age that has been previously or whether the user is hearing-impaired at a particular frequency using of a power amount of a frequency response such as a modulation frequency.

Meanwhile, the processor 130 may determine the hearing sensitivity of a user according to the listening situation based on the brainwave data of a user responding to the test signal. In this case, the processor 130 may determine the hearing sensitivity of a user per listening situation using the brainwave data of a user received in various listening situations.

Herein, the hearing sensitivity may include at least one of the ambient noise sensitivity, the body activity sensitivity, the temperature sensitivity, the audio data sensitivity and the recognition state sensitivity, and may include a numerical value reflects effects of changes in the ambient noise, the body activity, the temperature, the audio data and the recognition state that influences the hearing characteristics of a user.

For example, the processor 130 may calculate the hearing sensitivity of a user based on EQN. (1). EQN. (1) may assume and consider an ambient noise sensitivity, a body activity sensitivity, a temperature sensitivity, and an audio data sensitivity for the convenience of explanation.

$$\frac{\Delta \text{hearing level}(i_N - i_1)}{(t_N - t_1)} = \quad \text{EQN. (1)}$$
$$a \times \Delta \text{Noise} + b \times \Delta \text{Activity} + c \times \Delta \text{BodyTemp} + d \times \Delta \text{Contents}$$

Herein, a represents ambient noise sensitivity, b represents body activity sensitivity, c represents temperature sensitivity, and d represents audio data sensitivity.

Specifically, the processor 130 may determine a minimum audible level of a user, $i_N$ and $i_1$ (dB), at specific times, $t_N$ and $t_1$, respectively, based on the test signal, and calculate a variation amount of the minimum audible level between the specific times, $t_N$ and $t_1$, i.e., $$\frac{\Delta \text{hearing level}(i_N - i_1)}{(t_N - t_1)},$$

based on the minimum audible levels, $i_N$ and $i_1$ (dB).

Further, the processor 130 may determine the ambient noise, a body activity amount, the temperature and the audio data type at the specific times, $t_N$ and $t_1$, based on the situation data. The processor 130 may calculate a variation amount of the ambient noise, ΔNoise, a variation amount of the activity, ΔActivity, a variation amount of the temperature, ΔBodyTemp, and a variation amount of the audio data, ΔContents, between corresponding times, as discussed above.

In this case, the processor 130 may numerically calculate each of the variation amounts between the specific times by digitizing each of the ambient noise, the activity amount, the temperature and the audio data type.

For example, the processor 130 may divide the ambient noise, the activity level and the temperature with a preset range unit, map specific values respectively with the ranges, and map specific values respectively with the genres of the audio data.

Specifically, the ambient noise may be divided into a plurality of 20-dB units, such as, for example, 0 dB~20 dB, 20 dB~40 dB, and 40 dB~60 dB. Further, 0 dB~20 dB may be mapped with "0", 20 dB~40 dB may be mapped with "1", and 40 dB~60 dB may be mapped with "2".

The activity amount, i.e., the calorie consumption amount may similarly be divided into a plurality of 100-calorie units such as 0 calories~100 calories, 100 calories~200 calories, and 200 calories~300 calories. Further, 0 calories~100 calories may be mapped with "0", 100 calories~200 calories may be mapped with "1", and 200 calories~300 calories may be mapped with "2".

The body temperature may similarly be divided with a plurality of 0.2° C. units such as 36.0° C.~36.2° C., 36.2° C.~36.4° C., 36.4° C.~36.6° C., and 36.6° C.~36.8° C. Further, 36.0° C. 36.2° C. may be mapped with "0", 36.2° C.~36.4° C. may be mapped with "1", 36.4° C.~36.6° C. may be mapped with "2", and 36.6° C.~36.8° C. may be mapped with "3".

The audio data may be categorized by their genres, such as, for example, classical, ballad, dance, and rock. Further, the classical genre may be mapped with "0", the ballad genre may be mapped with "1", the dance may be mapped with "2", and the rock genre may be mapped with "3".

However, the above values are examples provided for the convenient explanation, and may not be limited to herein.

Thereby, the processor 130 may calculate the ambient noise sensitivity a, the body activity sensitivity b, the temperature sensitivity c, and the audio data sensitivity d based on the variation amounts in the minimum audible level, the ambient noise, the activity, the temperature, and the audio data.

Further, the processor 130 may calculate a recognition state sensitivity of a user based on the brainwave data of a user responding to the test signal.

A recognition state of a user may generally indicate various states of a user that may be influenced via hearing directly and indirectly, and may include at least one of a listening effort of a user, an intelligibility, a fatigue degree, a concentration degree, a preference degree, a remembering state, and a sentimental state.

A listening effort may generally indicate effort made by a user in order to hear corresponding sound. When voice signal is presented to a user, the processor 130 may modify measured brainwave data into the frequency domain, extract an angular entropy value, and calculate a listening effort from the angular entropy value. (Bernarding et al., 2013 IEEE EMBS Conference on Neural Engineering, "Extraction of Listening Effort Correlates in the Oscillatory EEG Activity: Investigation of Different Hearing Aid Configurations"). Further, the processor 130 may measure the listening effort of a user in order to hear the voice signal through the auditory late responses (ALRs) which is a kind of ear reference point (ERP) in the time domain (Strauss et al., 2010 Cognitive Neurodynamics, "Electrophysiological correlates of listening effort: neurodynamical modeling and measurement").

An intelligibility may generally indicate a degree of understanding of a sound by a user. When a voice signal based on a single sound, a word, a syllable, and a sentence is presented to a user, the processor 130 may modify or convert the measured brainwave data into its frequency domain equivalents, measure a degree in which an α-wave (8-12 Hz) is suppressed, and detect the intelligibility regarding the single sound, word, syllable or sentence. (Obleser and Weisz, 2011 Cerebral Cortex, "Suppressed Alpha Oscillations Predict Intelligibility of Speech and its Acoustic Details").

A fatigue degree may generally indicate changes in the body that affects whether a user can continue to hear, and may include the tiredness and the cognitive workload. The processor 130 may modify or convert the brainwave data of a user into its frequency domain equivalents, and may determine the fatigue degree from power changes of δ-wave (0-4 Hz), θ-wave (4-8 Hz), α-wave (8-12 Hz), β-wave (12-30 Hz), an average power of a dominant frequency and a dominant peak, a center of a gravity frequency and a frequency variability. (Shen et al., 2008 Clinical Neurophysiology, "EEG-based mental fatigue measurement using multi-class support vector machines with confidence estimate"). Further, the processor 130 may divide and express the fatigue degree with at least two steps, or express the fatigue degree to be consecutive numbers (e.g., from 0 to 100) with an approximation such as linear, polynomial, logarithm, and exponential for more detailed and quantitative expression.

A concentration degree may generally indicate whether a user focuses on hearing or on other senses. The processor 130 may determine the concentration of a user on the hearing signal from the specific frequency provided to a user or the size of ASSR regarding the combination signal of the above.

A remembering state may generally indicate whether a user remembers an audio or a voice signal which is currently presented from the past hearing experience. The processor 130 may determine whether a user remembers the audio or the voice signal through an increase of γ-band (30-50 Hz) power shown immediately after the audio or the voice signal has been presented to the user. (Lenz et al., 2007 International Journal of Psychophysiology, "What's that sound").

A preference degree may generally indicate a preference of a user regarding the audio and/or the voice signal which is currently presented. The processor 130 may distinguish the preference of a user from an increasing and a decreasing of a power including the γ-band (30-50 Hz) of the brainwave which is modified or converted to its frequency domain equivalent. (Pan et al., 2013 IEEE EMBS Conference on Neural Engineering, "Common Frequency Pattern for Music Preference Identification using Frontal EEG").

Thereby, the processor 130 may determine and digitize the listening effort of a user, the intelligibility, the fatigue degree, the concentration degree, the preference degree, the remembering state and the sentimental state through the brainwave data, and calculate the recognition state sensitivity by adding the recognition state sensitivity to the EQN. (1) as a variable.

Thus, the processor 130 may transmit various formats of the test signals to the sound outputting apparatus 200, and determine the hearing characteristic and the hearing sensitivity based on the brainwave data of a user responding to the test signals.

Meanwhile, the processor 130 may provide the test signals at various time points and at various frequencies to the sound outputting apparatus 200 in order to obtain the brainwave data of the user.

For example, the processor 130 may transmit the test signal to the sound outputting apparatus 200, a) simultaneously when the audio data is reproduced, b) after a preset time passes over from a time of reproducing the audio data, per preset time interval, c) when the electronic apparatus 100 has been used for more than a preset time, or d) at a time when the audio data is not reproduced (e.g., the part after reproducing one audio data and before reproducing the next audio data, the part after reproducing the first verse and before reproducing the second verse, or the like). Further, the processor 130 may provide the test signal in a format that provides sounds of various frequencies within about 10 seconds before and after the reproduced audio data, or sounds of specific frequencies are consecutively provided.

However, providing a test signal may not be limited to the above. For example, in some embodiments, the processor 130 may automatically determine a time point or a frequency when the test signal is transmitted. In other embodiments, the processor 130 may provide the test signal at the time point and frequency selected by a user.

Further, in addition to a regular measurement, when changes exceed a certain level in the response of the brainwave data, or the hearing characteristic measured based on the above response regarding a certain signal (e.g., music or voice) under similar listening environments, the processor 130 may re-measure the hearing ability of a user, and provide the test signal for the re-measuring of the hearing ability.

In this case, the processor 130 may provide a default signal or a signal selected by a user as a test signal. However, the processor 130 may properly modify a preset type of the test signal according to the listening situation, or modify and provide a type or a size of the test signal.

Meanwhile, although the above embodiment describes that the listening information of a user is determined using the brainwave data, the listening information of a user may also be determined using other methods.

For example, when the brainwave of a user cannot be measured through the sound outputting apparatus 200, the processor 130 may determine the listening information of a user when the user manually input or manipulate in response to the test signal (e.g., pushing a button or touching a touch screen provided on the electronic apparatus 100). Thus, a user may manually input and provide the response regarding the test signal to the electronic apparatus 100 whenever the test signal is heard, and the processor 130 may determine the listening information of the user based on the response provided.

Thereby, when the hearing characteristic and the hearing sensitivity are determined based on the brainwave data of a user responding to the test signal, the processor 130 may update the audio output information corresponding to the hearing characteristic and the hearing sensitivity.

Thus, by considering that the hearing characteristic and the hearing sensitivity of a user may be determined according to the change of the listening situation, the processor 130 may update the audio output information to adjust a current hearing characteristic and hearing sensitivity of a user based on the brainwave data. Specifically, the hearing sensitivity calculated based on the brainwave data may correspond to the hearing sensitivity of a user listening to the sounds indicative of the audio data, not any ordinary people. Thus, the audio output information updated based on the brainwave data may include the information more suitable for a user listening to the sounds indicative of the audio data.

Specifically, the processor 130 may generate the audio output information suitable for the hearing characteristic and the hearing sensitivity determined via reflecting the hearing characteristic and the hearing sensitivity determined based on the brainwave data on the audio output information generating algorithms. Alternatively, the processor 130 may generate the audio output information suitable for the hearing characteristic and the hearing sensitivity by updating previous audio output information. In this case, the processor 130 may update the audio output information by considering the listening situation of a user.

For example, the processor 130 may modify the audio output information by adjusting an equalizer so that frequency domain equivalents of the audio output information can be sensed well.

Further, the processor 130 may process the audio output information to improve the clarification of the voice signal during a phone call, or the voice signal included in the audio data, and process the audio output information so as to adjust the voice signal to be the level in which the decreasing of the clarification due to the noise that can be added and the increasing of the listening effort are not shown.

Further, when a user is determined to sense fatigue or sleep while listening to the sounds indicative of the audio data, the processor 130 may modify the audio output information to adjust the volume of the sounds and/or the power of the sound outputting apparatus 200, according to a user setting for increasing or decreasing a recognition degree regarding the audio data.

Specifically, when a user sleeps while listening to the sounds indicative of the audio data, the processor 130 may modify the audio output information to automatically minimize or reduce the volume level of the sound outputting apparatus 200, or to stop reproducing the audio data so that the audio data cannot be further generated. In this case, the processor 130 may transmit a control signal to turn off the power to the sound outputting apparatus 200 when another power is provided on the sound outputting apparatus 200.

Further, when a user is determined to simultaneously engage in an activity (e.g., exercising) while listening, or when the concentration degree on the sounds indicative of the audio data is relatively lower than another sensing organ (e.g., visual organ), the processor 130 may modify the audio output information to reduce the volume of the sounds indicative of the audio data. On the contrary, when a user exhibits a concentration degree higher than a predetermined level regarding the sounds indicative of the audio data for more than a certain amount of time, the processor 130 may modify the audio output information to increase the volume properly based on the ambient noise and the hearing characteristic of a user.

Further, when a user is determined to make a phone call or have a conversation, the processor 130 may modify the audio output information to enhance, increase, or maximize the intelligibility on the voice signal of a talking party so as to reduce or minimize the listening effort based on the measured brainwave data.

Further, when the intelligibility of a user for a specific frequency is lower than a predetermined level, the processor 130 may perform reinforced noise cancellation of frequencies except for the specific frequency, or apply the volume and the definition (or, the clarity) differently, and modify the audio output information to be a format in which the sound of the specific frequency is strengthened.

Further, when the listening effort of a user is higher than a predetermined level, the processor 130 may modify the audio output information so as to apply the volume/tone in which the listening effort may be reduced or minimized by modifying one or more parameters related to the volume and by checking listening effort determined based on the brainwave data.

Further, the processor 130 may modify the audio output information to modify the output state of a specific musical instrument play in the audio data.

Specifically, when providing the audio data constituted with a plurality of musical instruments (e.g., piano, drum and violin) including classical music, the processor 130 may confirm a user response regarding at least one of an ERP and an ASSR shown on different play sections of each musical instrument, and determine a type of musical instrument play that a user is most interested in. In this case, the processor 130 may adjust the equalizer and modify the audio output information so that the musical instrument play that the user is most interested can be better delivered and/or presented.

Specifically, when the hearing sensitivity of a user calculated through EQN. (1) is reflected on the audio output information for the headphone in Table II, the audio output information of Table II may be modified as shown in Table V.

TABLE V

| Basic start volume level | B |
|---|---|
| Maximum/Minimum volume level | Min = B − 20~Max = B + 60 |
| Volume adjust width per hearing threshold shift | ±5/unit shift |
| Calculating formula for hearing threshold shift amount | −($X_1$ × k × Δ Noise + $X_2$ × Δ Activity + $X_3$ × Δ BodyTemp + $X_4$ × k × Δ Contents) |
| Maximum hearing approved time | 30 min. |

TABLE V-continued

| Frequency 1 amount (e.g., 125 Hz) | (L) CV + 0 | (R) CV + 1 |
| Frequency 2 amount (e.g., 250 Hz) | (L) CV + 3 | (R) CV + 5 |
| . | . |
| . | . |
| . | . |
| Frequency N amount (e.g., 4000 Hz) | (L) CV + 10 | (R) CV + 20 |

Further, when the hearing sensitivity of a user calculated through EQN. (1) is reflected on the audio output information for the sound bar of a user in Table III, the audio output information of Table III may be modified as shown in Table VI.

TABLE VI

| Basic start volume level | C' |
|---|---|
| Maximum/Minimum volume level | Min = C' − 5~Max = C' + 70 |
| Volume adjust width per hearing threshold shift | ±3/unit shift |
| Calculating formula for hearing threshold shift amount | −($X_1$ × m × Δ Noise + $X_2$ × Δ Activity + $X_3$ × Δ BodyTemp + $X_4$ × m × Δ Contents) |
| Maximum hearing approved time | 52 min. |
| Frequency 1 amount (e.g., 125 Hz) | (ch1) CV + 0 . . . | (chM) CV + 1 |
| Frequency 2 amount (e.g., 250 Hz) | (ch1) CV + 3 . . . | (chM) CV + 5 |
| . | . |
| . | . |
| Frequency N amount (e.g., 4000 Hz) | (ch1) CV + 9 . . . | (chM) CV + 9 |

Meanwhile, the processor 130 may determine the listening situation of a user based on the listening data, and determine the audio output information corresponding to the brainwave data of a user and the listening situation of a user.

Specifically, the processor 130 may determine the listening information and the hearing sensitivity of a user based on the brainwave data received, update the audio output information per listening situation stored in the electronic apparatus 100 based on the listening information determined, and determine the audio output information suitable for the listening situation of a user among the updated audio output information.

Meanwhile, although the above embodiment describes that the processor 130 may update the audio output information and may determine the audio output information suitable for the listening situation of a user with the updated audio output information, this is merely one of embodiments. Thus, when the audio output information updated according to the brainwave data of a user is previously stored, the processor 130 may determine the audio output information suitable for the listening situation of a user with the updated audio output information which is previously stored.

Thereby, the processor 130 may use the previously updated audio output information when a user keeps the listening information and the hearing sensitivity uniform to the previous experiences.

Meanwhile, the processor 130 may control the output state of the audio data using the audio output information determined based on the listening situation of a user or the audio output information determined based on the brainwave data of a user and the listening situation.

Herein, the audio output information may include information regarding at least one of the equalizer, the volume and the recommended time for continued listening. Thus, the processor 130 may modify the equalizer, the volume and the recommended time for continued listening applied to the audio data according to the determined audio output information, modify an output state of the audio data, and transmit to the sound outputting apparatus 200.

For example, the processor 130 may transmit the audio data in which the output state is modified to the sound outputting apparatus 200 according to the audio output information. Otherwise, while transmitting the audio data in which the output state is not modified to the sound outputting apparatus 200, the processor 130 may transmit the audio data in which the output state is modified according to the audio output information to the sound outputting apparatus 200.

Meanwhile, the processor 130 may control an output state of the audio data using various methods.

For example, the processor 130 may control the output state of the audio data by dividing the audio data into sound signal and voice or vocal signal.

Further, the processor 130 may modify the volume of the audio data by adjusting a limiter, a compressor, an expander, and a noise gate according to the audio output information determined.

Further, the processor 130 may modify the audio data so that a user can hear the sound most similar to the original sound by adjusting a filter, an equalizer (EQ), and/or a de-esser according to the determined audio output information.

Further, the processor 130 may substitute the audio data which is currently presented to a user with other audio data based on a user preference and a listening environment, and reproduce, or re-arrange so that some audio data can be excluded later, repeatedly reproduced, or frequently presented later.

Meanwhile, the processor 130 may modify an output state of the audio data automatically or according to a user command.

In this case, a user command may be inputted in various formats such as direct inputting like gestures, touches, voice, button inputting, and menu selecting or indirect inputting like electroencephalogram (EEG) and electrooculogram (EOG).

For example, when a user is trying to read without interruptions from others, he may input a motion to blink his eyes longer for three or four times, or shake his hand near to the ear. The processor 130 may modify or may not modify the output state of the audio data based on the determined audio output information.

Meanwhile, the processor 130 may control the electronic apparatus 100 to provide the various services related to a user listening to the sounds indicative of the audio data.

Specifically, when a hearing-impaired risk of a user is sensed based on the brainwave data, the processor 130 may provide a notice to suggest resting to a user through voice and/or visual information, or provide therapy services (e.g., Constraint-induced sound therapy) to improve hearing.

Meanwhile, when a plurality of users hear the sounds indicative of the audio data using the electronic apparatus 100, electronic apparatus 100 may confirm a user currently using the electronic apparatus 100 in order to provide optimized or enhanced sounds to each user.

In this case, the processor 130 may compare the brainwave data with the previously stored brainwave data, confirm the current user based on the comparison, and provide the service according to the confirmed user.

Specifically, the processor 130 may determine whether the brainwave data is previously stored or first measured based on an original feature shown periodically and/or repeatedly in the brainwave data of a user, and provide the service accordingly.

For example, when the brainwave data of a user is first measured, the processor 130 may newly generate and store a profile of the measured user. Further, the processor 130 may provide a welcome signal or a welcome comment when the brainwave data of a user matches or is similar to previously stored brainwave data.

Meanwhile, the original feature may indicate feature shown periodically and/or repeatedly in the brainwave data of the specific user measured in a music listening situation or other situations (e.g., resting). Such feature may be expressed by a power spectral density of the brainwave data which is modified or converted into its frequency domain equivalents. (Lee et al., 2013 IEEE EMBS Conference on Neural Engineering, "A Study on the Reproducibility of Biometric Authentication based on Electroencephalogram (EEG)") or the auto-regression model thereof (Rocca et al., 2012 IEEE International Conference of the Biometrics Special Interest Group, "EEG Biometrics for Individual Recognition in Resting State with Closed Eyes").

However, a user may be identified through various methods other than the above described methods. For example, the processor 130 may identify a user through various methods such as ID/PASSWORD, fingerprints identifying, and face identifying.

Meanwhile, the processor 130 may automatically manage the audio data based on the brainwave data of a user.

Specifically, the processor 130 may manage the play list and the favorite list by analyzing the user preference regarding the audio data based on the brainwave data. Further, the processor 130 may suggest and provide various pieces of information related with the audio data to a user.

For example, the processor 130 may determine the preference based on the audio data, the remembering degree, and the listening environment at a time point when the audio data is heard from the brainwave data of a user hearing the audio data, and adjust the reproducing frequency and order of the audio data based on at least one of the preference, the remembering degree and a listening environment determined.

For example, when a positive preference is sensed on specific audio data, the processor 130 may separately manage the audio data by including the audio data on a favorite list, or suggest other audio data similar to the genre, the pattern, the singer, and the composer of the specific audio data at real time. Further, the processor 130 may determine whether a user remembers the audio data because he previously listened to the sounds indicative of the audio data. In some embodiments, the processor 130 may also determine whether a user listens to the sounds indicative of the audio data for a first time, based on the brainwave data of a user listening to the sounds indicative the audio data. When it is determined that the user is indeed listening to the sounds indicative the audio data for the first time, the processor 130 may provide the information regarding the audio data (e.g., title and player name) while presenting the audio data or immediately after the reproducing through the voice or visual information.

Meanwhile, the processor 130 may determine a desire-to-move of a user based on the event-related desynchronization (ERD) and the event-related synchronization (ERS) which are inferred from the changes in an average a band power after measuring the brainwave data of a user. (Daly et al., 2014 IEEE EMBC, "Changes in music tempo entrain movement related brain activity").

Specifically, the processor 130 may determine a relation between a degree in which a user moves or is trying to move a specific body part such as hand or foot, and a tempo or a rhythm of the sounds (e.g., music) indicative of the audio data by comparing a tempo obtained from the currently reproduced audio data with the size of ERD/ERS of the user. In this case, when there is relation between the degree in which a user moves or is trying to move the body part and the tempo or the rhythm of the music, the processor 130 may provide a visual, an auditory or a touching signal to a user based on the relation or the degree of the relation determined.

For example, the processor 130 may virtually visualize a movement of the user into an avatar or a character dancing on a display 92 (of FIG. 1) of the electronic apparatus 100, or may overlay and output the sounds of the currently reproduced audio data based on the movement of the user. Further, the processor 130 may add or insert a sound clip as if a user directly joins in playing with more than one specific musical instrument, a clap, or a cheer like "Ya-Ho." Further, the processor 130 may provide a feedback so that a user can sense the sounds with, for example, vibrations on the electronic apparatus 100 whenever the user moves.

Thereby, even when a user is studying and/or working, or is at the public place, he can virtually dance with his mind and brain without actually moving his body or virtually join in the music play or music recital with the remix, DJing, playing, and applauding.

Figure 2B:
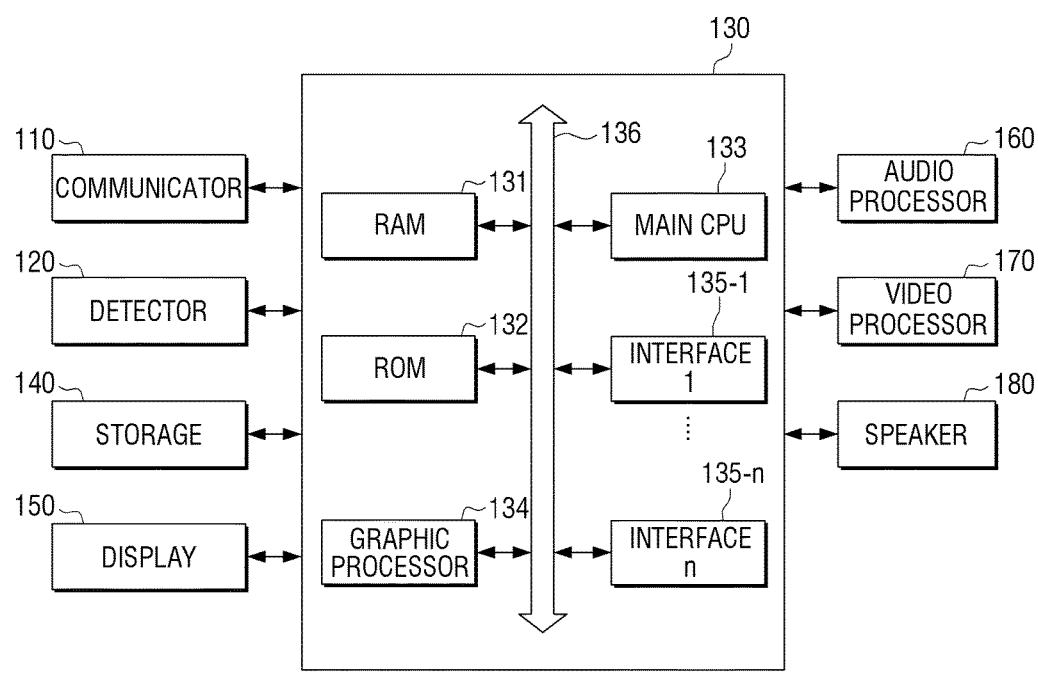
FIG. 2B is a detailed block diagram of the electronic apparatus according to an embodiment.

FIG. 2B is a block diagram illustrating an exemplary constitution of the electronic apparatus 100 of FIG. 2A according to an embodiment.

Referring to FIG. 2B, the electronic apparatus 100 may further include a storage 140, a display 150 (similar to the display 92 of FIG. 1), an audio processor 160, a video processor 170, and a speaker 180 in addition to the communicator 110, the detector 120, and the processor 130.

The processor 130 may include a random-access memory (RAM) 131, read-only memory (ROM) 132, a main central processing unit (CPU) 133, a graphic processor 134, a plurality of interfaces 135-1 through 135-n, and a bus 136.

The RAM 131, ROM 132, the main CPU 133, the graphic processor 134, and the plurality of interfaces 135-1 through 135-n may be connected to each other through the bus 136.

In some embodiments, at least one of the plurality of interfaces 135-1 through 135-n may be a network interface connected to an external device through network.

The main CPU 133 may access the storage 140, and may boot an operating system (O/S) stored in the storage 140. Further, the main CPU 133 may perform various operations by using various programs, contents and data stored in the storage 140.

The ROM 132 may store a command set for booting or initializing the electronic apparatus 100. When a turn-on command is inputted and electrical power is provided, the main CPU 133 may copy the stored O/S from the storage 140 to the RAM 131 according to the stored command, and boot the electronic apparatus 100 by implementing the 0/S. When the booting completes, the main CPU 133 may copy various application programs stored in the storage 140 to the RAM 131, and perform various operations by implementing the application programs copied to the RAM 131.

The graphic processor 134 may generate a screen having various objects such as icons, images, and text. For example, the screen may include a pointing object, a calculator (not illustrated) and a renderer (not illustrated). The calculator (not illustrated) may calculate feature values such as a coordinate value, a shape, a size, and a color that each object will be marked based on a layout of the screen and a controlling command. The renderer (not illustrated) may generate various layouts of screens including objects based on the feature values calculated in the calculator (not illustrated). The screen generated in the renderer (not illustrated) may be displayed through the display 150.

The storage 140 may store various data such as an O/S software module and various programs for driving the electronic apparatus 100.

Further, the storage 140 may store algorithms or programs to generate the audio output information and the audio output information generated according to the algorithms or programs.

Figure 2C:
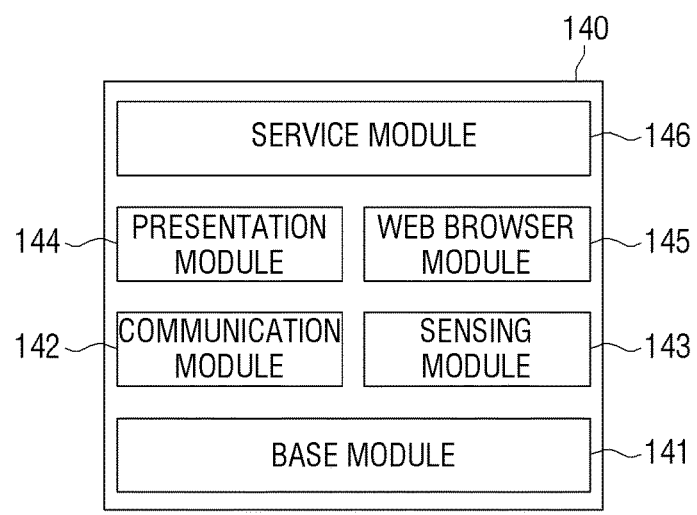
FIG. 2C is a detailed block diagram of the electronic apparatus according to an embodiment.

Meanwhile, as illustrated in FIG. 2C, the storage 140 may store programs to provide the functions according to various embodiments such as a base module 141, a sensing module 143, a communication module 142, a presentation module 144, a web browser module 145 and a service module 146.

The base module 141 may indicate basic module to process signals in the electronic apparatus 100 and deliver the processed signals to upper layer modules. In some embodiments, although not shown, the base module 141 may include a storage module, a security module and a network module. The storage module is a program module that manages a database (DB) or registry. The main CPU 133 may access data in the DB, for example, in the storage 140 using the storage module. The security module is a program module that supports hardware certification, request permission, and secured storage. The network module is a module that supports network connections, and may include a distributed network (DNET) module and a universal-plug-and-play (UPnP) module.

The sensing module 143 is a module that collects information from various sensors, and analyzes and manages the collected information. In this case, the sensing module 143 may include a touch recognition module, a head direction recognition module, a face recognition module, a voice recognition module, a motion recognition module, and a near-field communication (NFC) recognition module.

The communication module 142 may include a device module to communicate externally. The communication module 142 may include a device module to communicate with an external device, a messaging module such as messenger program, a Short Message Service (SMS) and Multimedia Message Service (MMS) program, and an e-mail program, and a call module including call info aggregator program module and voice-over Internet Protocols (VoIP) module.

The presentation module 144 is module to constitute the display screen. The presentation module 144 may include multimedia module to reproduce and to output the multimedia contents, and a user interface (UI) rendering module to process regarding UI and related graphic. The multimedia module may include player module, camcorder module, and sound processing module. Thereby, the multimedia module may reproduce various multimedia contents, and generate and reproduce the screen and the sound. UI rendering module may include image compositor module to combine images, coordinate combination module to combine and generate coordinates of the screen in which images will be displayed, X11 module to receive various events from the hardware, and 2D/3D UI toolkit to provide tools for constituting UI in 2D or 3D format.

The web browser module 145 may indicate module to perform the web browsing and access to the web server. The web browser module 145 may include various modules such as web view module to constitute the web page, download agent module to perform the downloading, bookmark module, and webkit module.

The service module 146 is module including various applications to provide various services. Specifically, the service module 146 may include various program modules such as SNS program, contents play program, game program, electronic book program, calendar program, alarm management program, and accessory widget.

The display 150 may provide various screens. Herein, the screens may include application implementing screens including various contents such as image, video, text and music, and UI screens.

The display 150 may be implemented as various formats of the display such as liquid crystal display, organic light-emitting diode, liquid crystal on silicon (LCoS), and digital light processing (DLP), and may function as a touch screen when combined with a touch panel.

In this case, the processor 130 may provide UI screen including various feedBack information through the display 150.

For example, the processor 130 may provide UI screen including various pieces of information such as information regarding the current listening situation, type and size of the test signal, suggested modified type and size of the test signal, manual modifying method of the test signal, and medical/psychological grounds.

Further, the processor 130 may provide various UI screens related with the hearing measurement of a user.

For example, the processor 130 may provide UI to select on/off of the brainwave data measurement, UI to select the time point and the frequency of measuring the listening information, UI to select the listening information to be measured, and UI to guide the user input when a user manually inputs the response regarding the test signal.

Meanwhile, regarding the measurement time point, may be provided UI to select the detailed situation such as immediately after wearing the sound outputting apparatus 200, before the hearing the specific audio data, during the hearing, after the hearing, during the sleeping, the changes in the hearing environment of a user (e.g., converting from the interior to the exterior or vice versa and changes in the noise) and the changes in the body situation (e.g., exercising and working state changes) according to the type of the listening information to be measured (e.g., hearing characteristic and type of the recognition feature).

Besides, the electronic apparatus 100 may further include the audio processor 160 to process the audio data, the video processor 170 to process the video data to be displayed on the display 150, the speaker 180 outputting various notice sounds or voice messages as well as various audio data processed in the audio processor 160, the camera photographing still image or video according to the controlling of a user, and the microphone receiving a user voice and various sounds and converting into the audio data.

Figure 3:
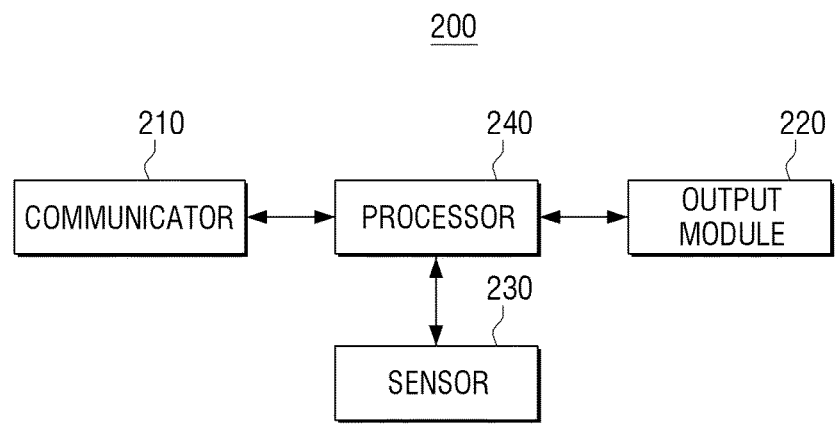
FIG. 3 is a block diagram illustrating constitution of a sound outputting apparatus according to an embodiment.

FIG. 3 is a block diagram illustrating the constitution of the sound outputting apparatus according to an embodiment.

Referring to FIG. 3, the sound outputting apparatus 200 may include the communicator 210, an output module 220, the sensor 230, and the processor 240. Meanwhile, the overlapping with the descriptions in FIG. 2 will not be specifically explained when describing FIG. 3.

The communicator 210 may communicate with the electronic apparatus 100.

Specifically, the communicator 210 may communicate with the electronic apparatus 100, and receive the test signal and the audio data.

In this case, the communicator 210 may communicate with the electronic apparatus 100 according to various methods.

For example, the communicator 210 may communicate with the electronic apparatus 100 through various wire and wireless communication methods such as Bluetooth (BT), wireless fidelity (Wi-Fi), ZigBee, infrared (IR), serial interface, universal serial bus (USB), and wire cable.

The output module 220 may output the audio data. Specifically, the output module 220 may output the first audio data and the second audio data received from the electronic apparatus 100.

The sensor 230 may detect the brainwave data of a user. For example, the sensor 230 may detect the brainwave data on the brow, the head skin or the other body part of a user by using at least one dry/wet/semi-dry type electrode (e.g., active electrode and EEG electrode).

The processor 240 may control general operation of the sound outputting apparatus 200. The processor 240 may include micom (or micom and CPU), RAM and ROM for the operation of the sound outputting apparatus 200.

The processor 240 may control the transmitting the brainwave data of a user detected by the sensor 230 to the electronic apparatus 100 through the communicator 210, the receiving and the outputting the second audio data, which is modified data of the first audio data, from the electronic apparatus 100.

Specifically, the processor 240 may control the output module 220 to output the received first audio data when the first audio data is received from the electronic apparatus 100.

Further, the processor 240 may output the test signal when a test signal is received, and transmit the brainwave data of a user responding to the test signal to the electronic apparatus 100.

Thus, when the text signal is received, the processor 240 may output the received test signal through the output module 220, control the sensor 230 to detect the brainwave data of a user responding to the test signal, and transmit the detected brainwave data to the electronic apparatus 100 through the communicator 210.

Thereby, the electronic apparatus 100 may determine the audio output information based on the sensing data and the brainwave data received from the sound outputting apparatus 200, and transmit the audio data in which the output state of the first audio data is modified according to the determined audio output information, i.e., the second audio data, to the sound outputting apparatus 200.

The processor 240 may control the output module 220 to output the received second audio data when the second audio data is received from the electronic apparatus 100.

Figure 4A:
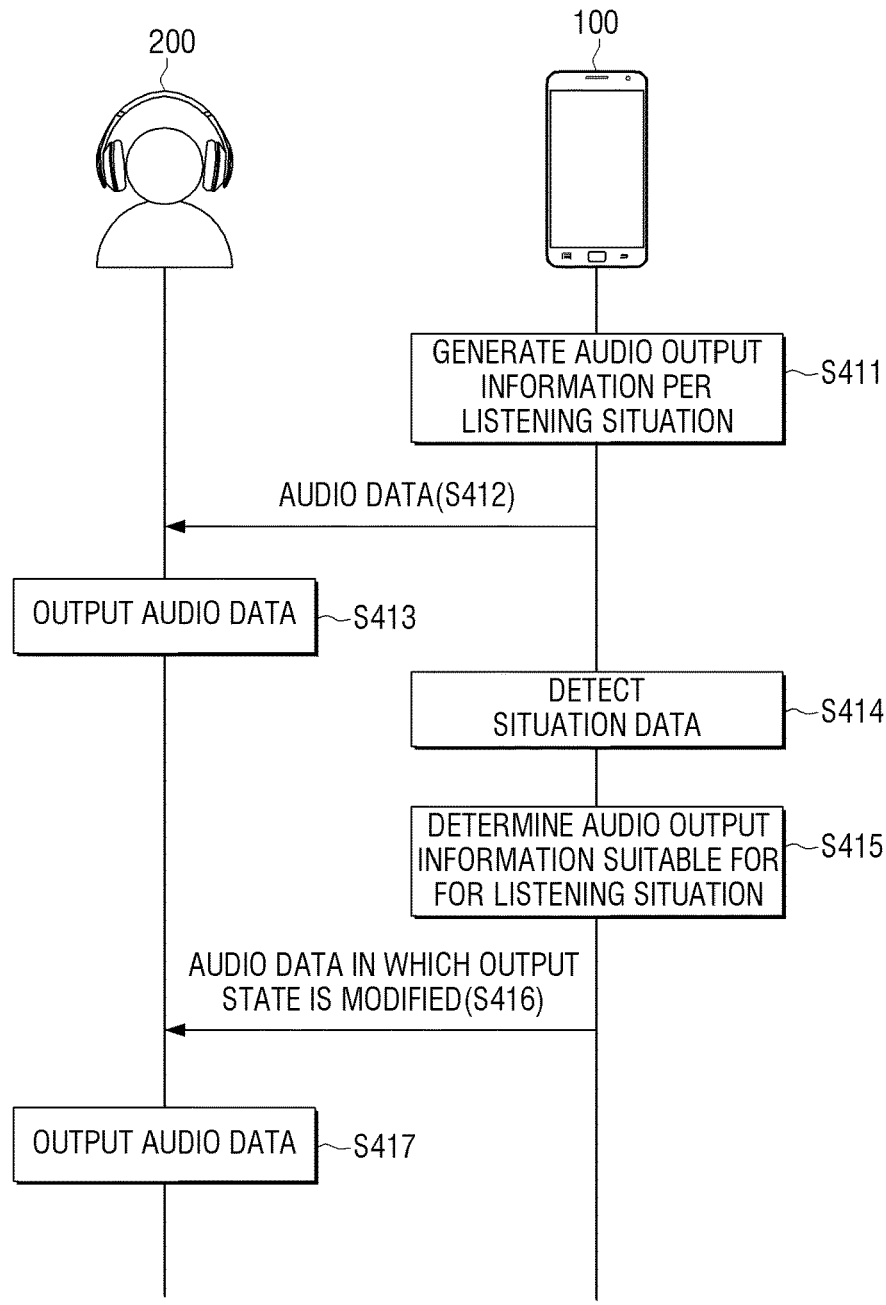
FIGS. 4A and 4B are sequence diagrams provided to explain operation of the electronic apparatus and the sound outputting apparatus according to an embodiment.
Figure 4B:
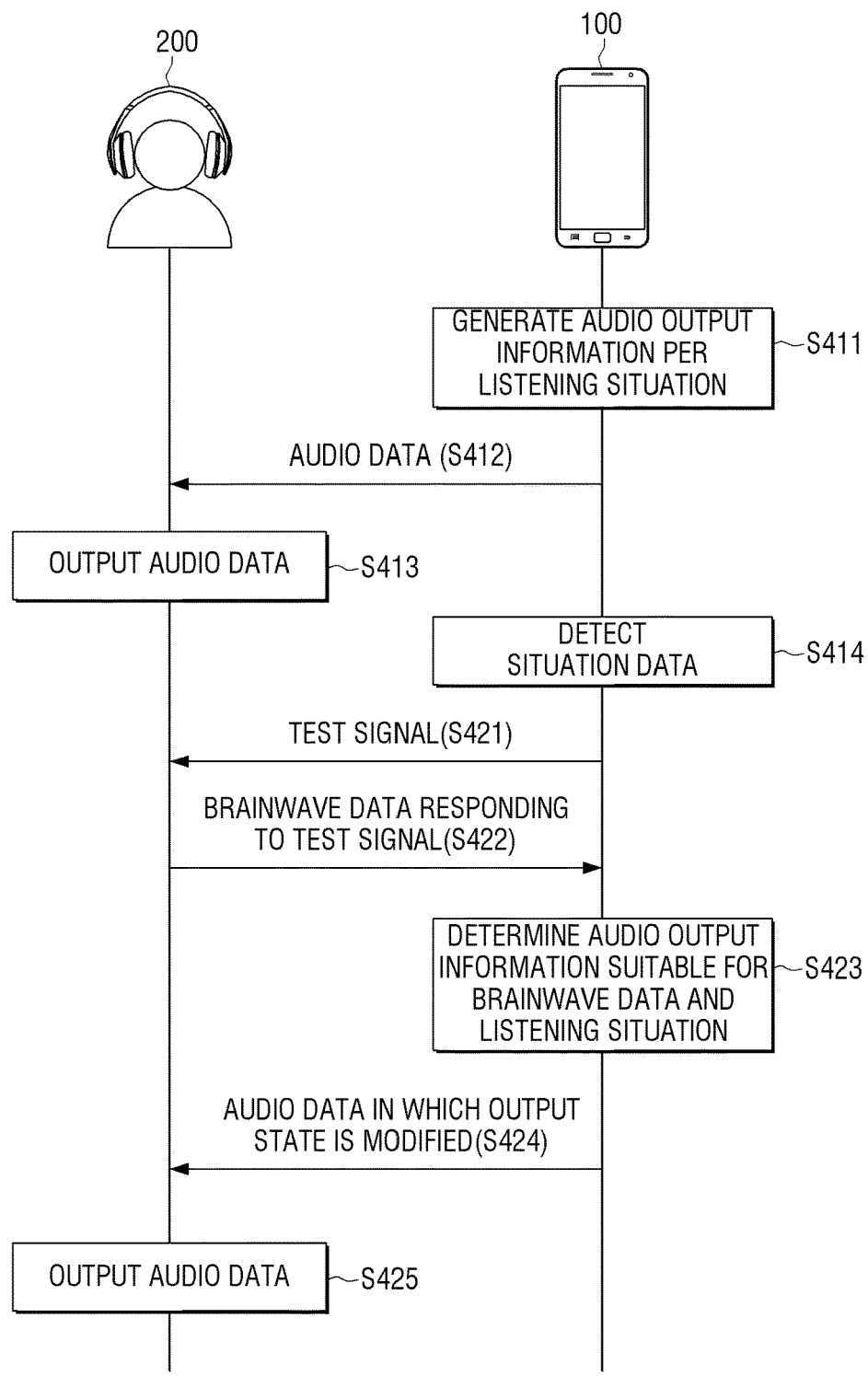

FIGS. 4A and 4B are sequence diagrams provided to explain the operation of the electronic apparatus and the sound outputting apparatus according to an embodiment.

Referring to FIG. 4A, the electronic apparatus 100 may generate and store the audio output information per listening situation at S411.

The electronic apparatus 100 may reproduce and transmit the audio data to the sound outputting apparatus 200 at S412, and the sound outputting apparatus 200 may output the received audio data from the electronic apparatus 100 at S413.

Herein, the audio data transmitted to the sound outputting apparatus 200 may be audio data in which the output state is not modified based on the audio output information.

At S414, the electronic apparatus 100 may detect the situation data of a user according to a preset event.

Herein, the preset event may be an event in which a preset time elapses after reproducing the audio data, an event in which a specific user command (e.g., driving a specific application or selecting a specific menu) is inputted, an event in which the listening situation is fast changing (e.g., the noise rapidly increases), an event in which a specific manipulation related with the hearing is inputted (e.g., the volume is too much increased), and an event in which the listening information of a user is fast changing (e.g., it is assumed that the user's hearing ability information is being measured). However, it may not be limited to herein.

At S415, the electronic apparatus 100 may determine the listening situation of the user based on the situation data, and determine the audio output information suitable for the listening situation.

Thereafter, the electronic apparatus 100 may modify the output state of the audio data based on the audio output information, and transmit the audio data that has been modified to the sound outputting apparatus 200 at S416. The sound outputting apparatus 200 may output the received audio data from the electronic apparatus 100 at S417.

Meanwhile, referring to FIG. 4B, S411 to S414 are similar to those explained in FIG. 4A.

After S414, however, as shown in FIG. 4B, the electronic apparatus 100 may transmit a test signal to the sound outputting apparatus 200 according to the preset event at S421, and the sound outputting apparatus 200 may transmit brainwave data responding to the test signal to the electronic apparatus 100 at S422.

Herein, the preset event may be an event in which a specific user command (e.g., driving a specific application or selecting a specific menu) is inputted from the electronic apparatus 100, an event in which a preset time elapses after reproducing the audio data, and an event in which the listening situation is fast changing. However, it may not be limited to herein.

At S423, the electronic apparatus 100 may determine the audio output information suitable for the brainwave data and the listening situation.

Thereafter, the electronic apparatus 100 may modify the output state of the audio data based on the audio output information and transmit the audio data in which the output state is modified to the sound outputting apparatus 200 at S424. The sound outputting apparatus 200 may output the audio data received from the electronic apparatus 100 at S425.

Figure 5:
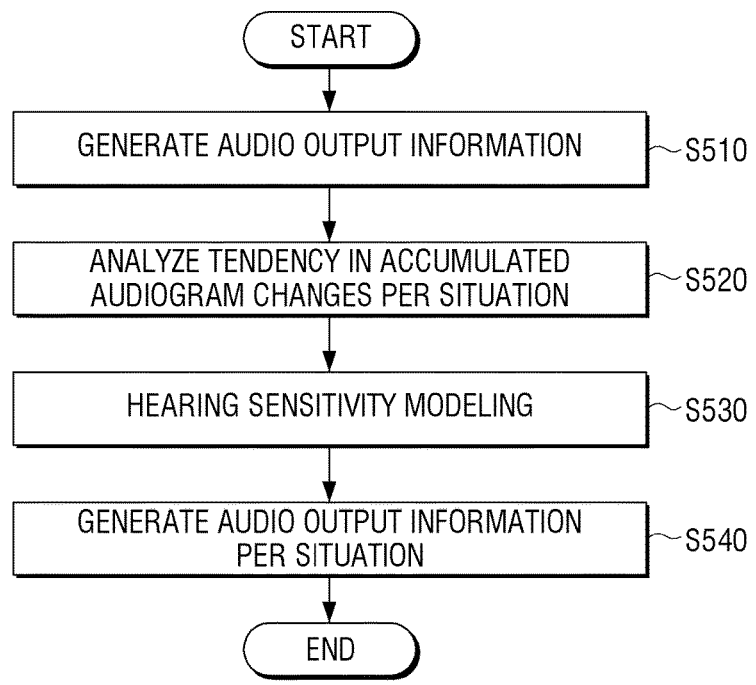
FIGS. 5 and 6 are diagrams provided to explain a method for generating audio output information according to an embodiment.
Figure 6:
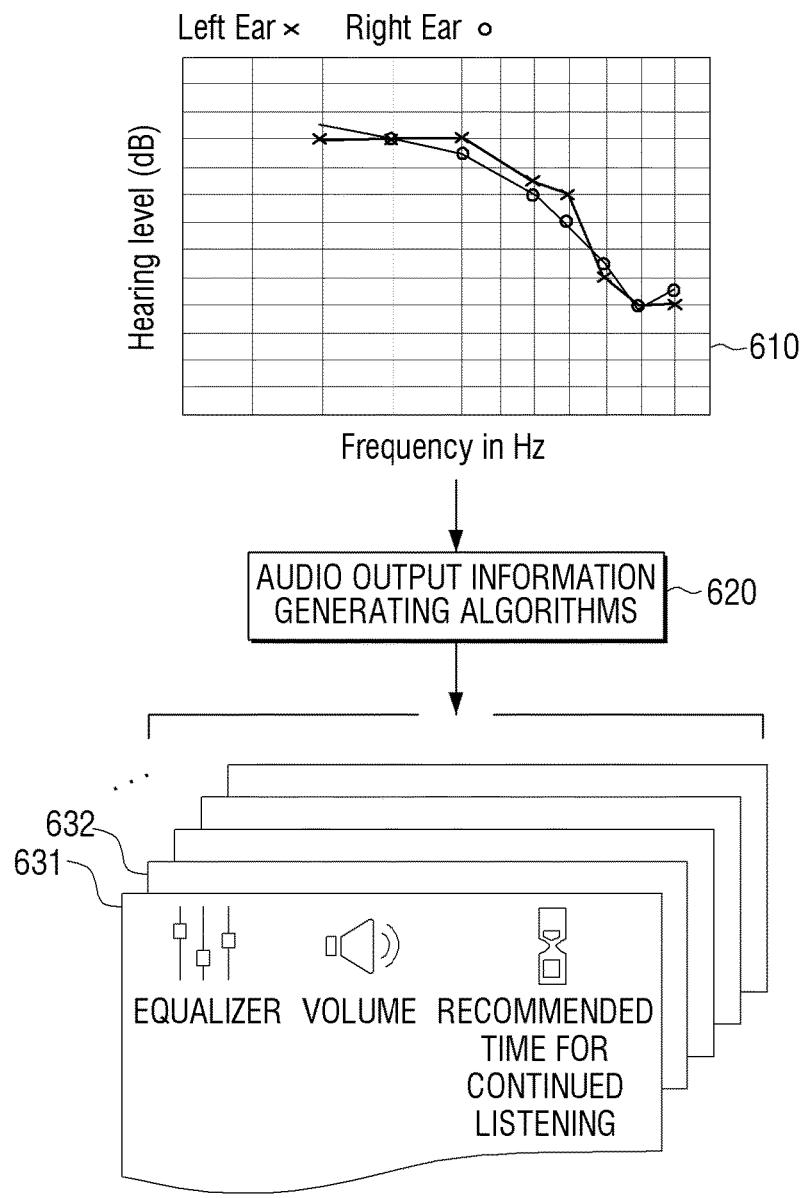

FIGS. 5 and 6 are diagrams provided to explain a method for generating the audio output information according to an embodiment.

Referring to FIG. 5, the electronic apparatus 100 of FIG. 1 may generate the audio output information per listening situation at S510.

Specifically, the electronic apparatus 100 may generate the audio output information per listening situation suitable for a user having the specific hearing characteristic (e.g., audiogram of 610 in FIG. 6) by using the audio output information generating algorithms 620 in FIG. 6. In this case, the electronic apparatus 100 may generate the audio output information using the hearing sensitivity of the ordinary listener instead of that of a specific user. Herein, the user audiogram may be measured through the electronic apparatus 100 or measured at a clinic or a web site, and provided to the electronic apparatus 100.

Further, the electronic apparatus 100 may determine the hearing characteristic and sensitivity of a user based on the brainwave data of a user responding to the test signal at S520 and S530.

Specifically, the electronic apparatus 100 may analyze a change tendency of an accumulated audiogram per listening situation and determine the hearing characteristic of a user.

For example, the electronic apparatus 100 may confirm a hearing loss due to the noise induced hearing-impaired symptom by analyzing a change amount of the high frequency audiogram per unit time, e.g., the change amount of the audiogram near to 4000 kHz. Further, the electronic apparatus 100 may analyze the change amount regarding a plurality of consecutive frequency audiograms, e.g., analyze whether the change amount is more than 30 dB on more than at a specific frequency within three consecutive frequency audiograms, and confirm any hearing loss due to the sudden hearing-impaired symptom.

Further, the electronic apparatus 100 may model the hearing sensitivity. In this case, the electronic apparatus 100 may initially model the hearing sensitivity of an ordinary listener, and model the hearing sensitivity of the corresponding user after the hearing sensitivity of a user is confirmed.

Specifically, the electronic apparatus 100 may model how much an audible threshold value (e.g. minimum audible level which the user is audible) is sensitively changed (e.g. how much the audible threshold value is affected by listening situation) when a user is out of a normal listening situation with a change amount of an audiogram (e.g. the audible threshold value) according to a time, and situation data regarding the listening situation for the corresponding time. For example, the electronic apparatus 100 may model an ambient noise sensitivity, a body activity sensitivity, a temperature sensitivity, an audio data sensitivity and a recognition state sensitivity.

Thereafter, the electronic apparatus 100 may generate optimized audio output information per listening situation (e.g., 631, 632, and so on in FIG. 6).

Specifically, the electronic apparatus 100 may generate the audio output information per listening situation suitable for a user having a specific hearing characteristic (e.g., 610 in FIG. 6) using the audio output information generating algorithms (620 in FIG. 6). In this case, the electronic apparatus 100 may generate the audio output information using the hearing sensitivity of the user.

Thus, the electronic apparatus 100 may generate the audio output information suitable for a user by considering the listening situation, the listening information of the user and the type information of the sound outputting apparatus 200. For example, the audio output information may include the maximum/minimum suggested volume preset information per listening situation, EQ information per frequency, the sound compensating the weak frequency domain sound based on the listening information of a user per listening situation, the volume to minimize hearing loss while the sound is adequately delivered for the recommended time for continued listening.

Figure 7:
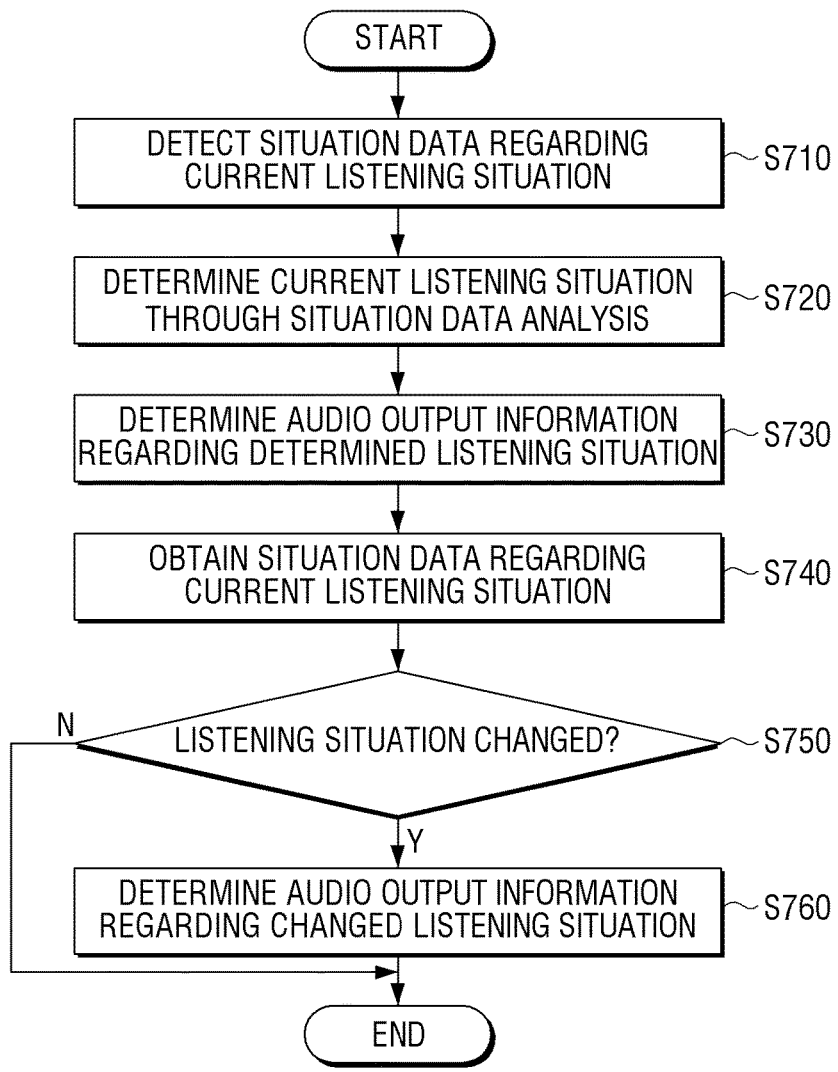
FIGS. 7 and 8 are diagrams provided to explain a method for determining the audio output information according to an embodiment.
Figure 8:
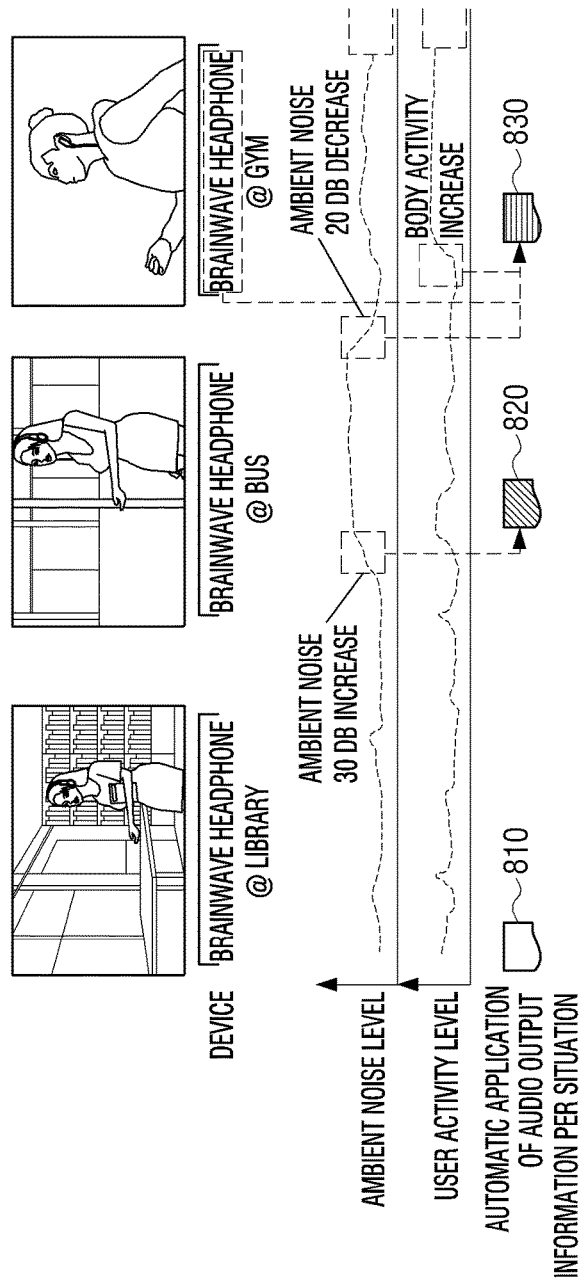

FIGS. 7 and 8 are diagrams provided to explain a method for determining the audio output information according to an embodiment.

Referring to FIG. 7, the situation data regarding the current listening situation may be detected at S710. For example, the electronic apparatus 100 may detect the situation data used in determining the listening situation of a user through the various sensors.

At S720, the current listening situation may be determined by analyzing the situation data. For example, as illustrated in FIG. 8, the electronic apparatus 100 may determine that the current listening situation has a very little noise and the activity is very little based on the situation data detected from the listening situation in which a user is reading a book at a library.

At S730, the electronic apparatus 100 may determine the audio output information regarding the determined listening situation. For example, as illustrated in FIG. 8, the electronic apparatus 100 may determine the audio output information 810 corresponding to the listening situation in which the noise and the activity are very little, reproduce and transmit the audio data in which the output state is modified according to the audio output information to the sound outputting apparatus 200. At S740, the electronic apparatus 100 may obtain situation data regarding current listening situation.

At S750, whether the listening situation is changed may be determined. Specifically, the electronic apparatus 100 may determine whether the listening situation is changed by analyzing another detected situation data.

Herein, critical values regarding the ambient noise and the user activity which determine whether the listening situation is changed may be established as being default. However, the critical values may be established and/or modified by a user. Further, preset critical values may be continuously updated based on the hearing characteristic of a user according to the listening situation. For example, as illustrated in FIG. 8, when a user moves around in a bus, the electronic apparatus 100 may determine that the listening situation is changed because the noise increases by more than 30 dB based on the detected situation data.

When the listening situation is determined to be changed at S750 ("Y" path), the audio output information regarding the changed listening situation may be determined at S760. For example, as illustrated in FIG. 8, the electronic apparatus 100 may determine the audio output information 820 corresponding to the listening situation in which noise level is high, and the user engages very little activity, reproduce and transmit the audio data in which the output state is modified according to the audio output information to the sound outputting apparatus 200.

Further, as illustrated in FIG. 8, when a user moves to a gym, the electronic apparatus 100 may determine that the listening situation of a user is changed based on the situation data such that the noise decreases by 20 dB while the user engages more activities, and the sound outputting apparatus 200 is modified from the brainwave headphone to the brainwave earphone.

In this case, the electronic apparatus 100 may determine the audio output information suitable for the changed listening situation, reproduce and transmit the audio data in which the output state is modified according to the audio output information to the sound outputting apparatus 200.

Thus, as illustrated in FIG. 8, the electronic apparatus 100 may determine the audio output information 830 suitable for the case in which the noise level is low while the user engages in a lot of activities, and the type of the sound outputting apparatus 200 is brainwave earphone, reproduce and transmit the audio data in which the output state is modified according to the audio output information to the sound outputting apparatus 200.

Figure 9:
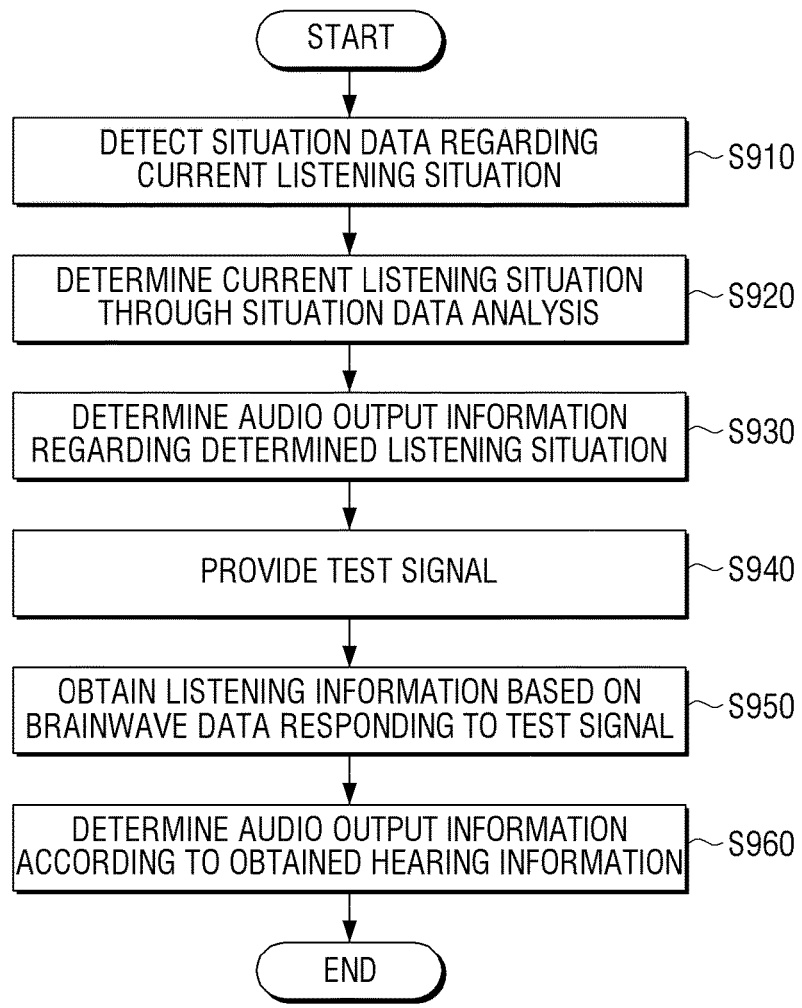
FIGS. 9 and 10 are diagrams provided to explain the method for determining the audio output information according to an embodiment.
Figure 10:
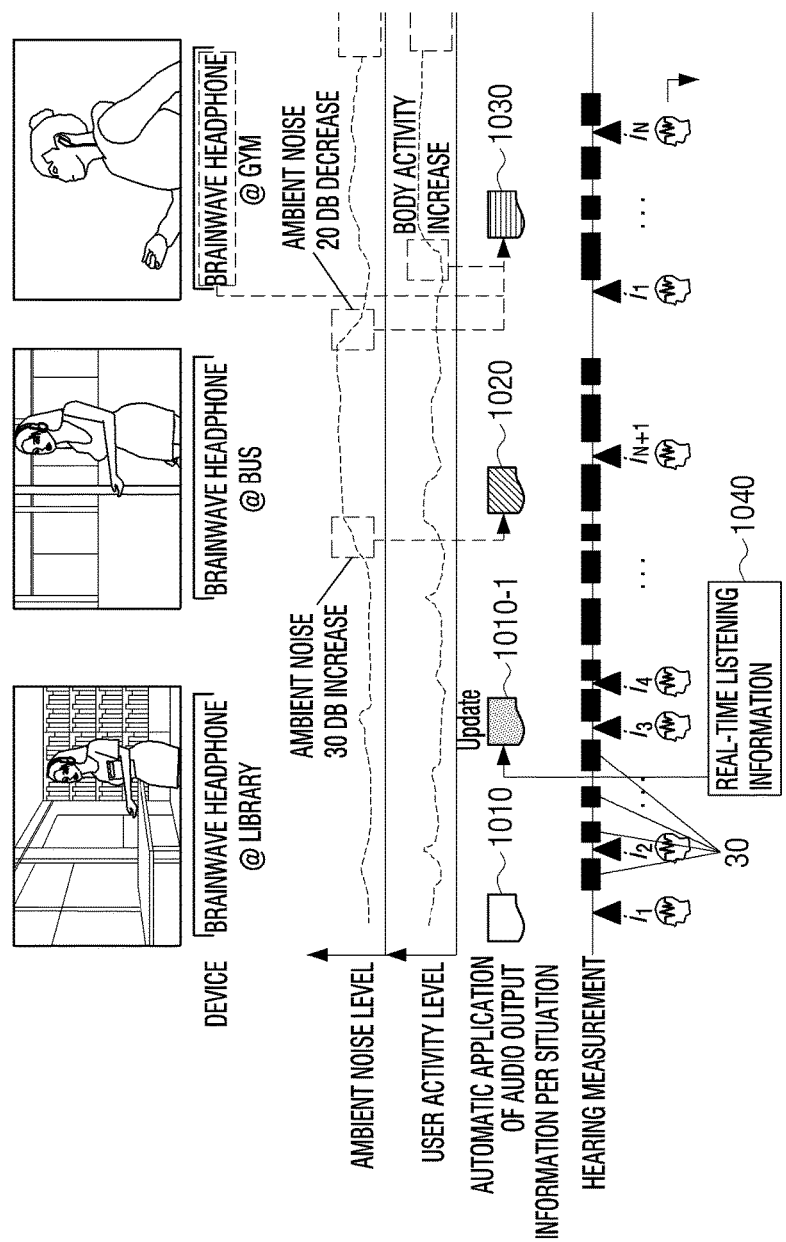

FIGS. 9 and 10 are diagrams provided to explain the method for determining the audio output information according to an embodiment.

As illustrated in FIG. 9, the situation data regarding the current listening situation may be detected at S910. For example, the electronic apparatus 100 may detect the situation data used in determining the listening situation of a user through the various sensors.

At S920, the current listening situation may be determined by analyzing the situation data. For example, as illustrated in FIG. 10, the electronic apparatus 100 may determine the current listening situation to be situation in which the noise and the activity are very little based on the situation data received when a user is reading a book at a library.

At S930, the electronic apparatus 100 may determine the audio output information regarding the determined listening situation. For example, as illustrated in FIG. 10, the electronic apparatus 100 may determine the audio output information 1010 corresponding to the listening situation in which the noise level is low and the user engages in very little activity, reproduce and transmit the audio data in which the output state is modified according to the audio output information to the sound outputting apparatus 200.

Thereafter, the hearing test signal may be provided to the sound outputting apparatus 200 at S940. For example, as illustrated in FIG. 10, the electronic apparatus 100 may provide the test signals ($i_1, \ldots, i_{N+1}$) between the audio data 30.

At S950, the listening information of a user may be determined based on the brainwave data responding to the test signals. For example, as illustrated in FIG. 10, the electronic apparatus 100 may obtain the real-time listening information 1040. Herein, the listening information 1040 may include at least one among the above described hearing characteristic and hearing sensitivity of a user.

At S960, the audio output information may be determined based on the obtained listening information of a user. For example, as illustrated in FIG. 10, the electronic apparatus 100 may update the audio output information 1010, modify and reproduce the output state of the audio data based on the updated audio output information 1010-1.

Thereafter, the electronic apparatus 100 may determine the audio output information 1020, 1030 based on the listening information of a user according to the brainwave data, modify and reproduce the output state of the audio data based on the audio output information 1020, 1030.

Figure 11:
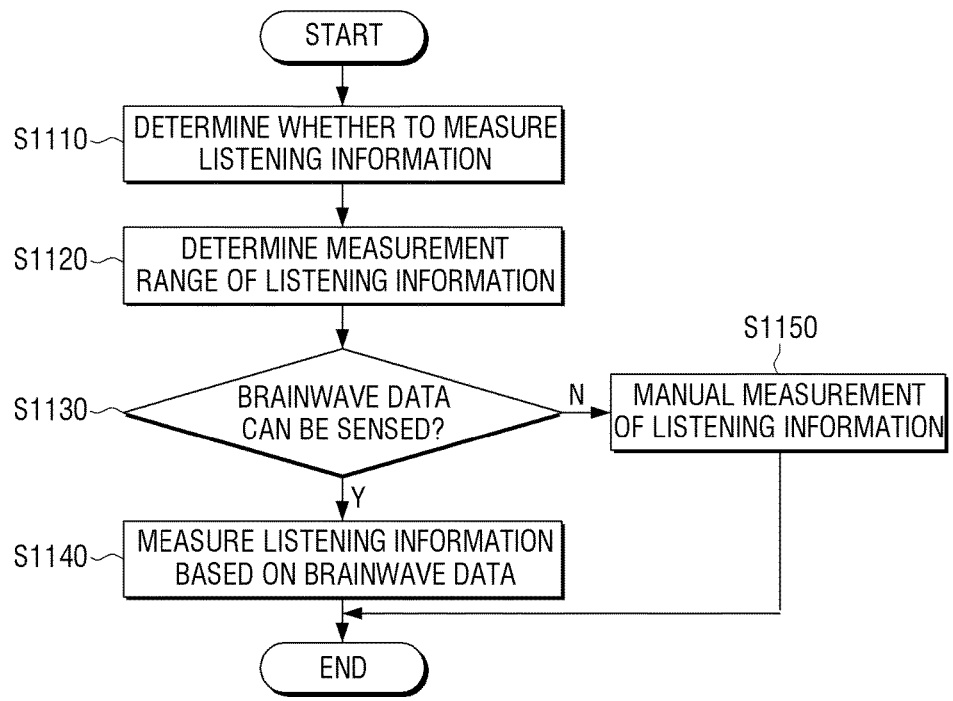
FIG. 11 is a diagram provided to explain a method for measuring the hearing ability according to an embodiment.

FIG. 11 is a diagram provided to explain a method for measuring the listening information according to an embodiment.

Referring to FIG. 11, S1110 determines whether to measure listening information, and S1120 determines measurement range of listening information.

For example, measuring of the listening information may be determined to be performed when a user requests, a user account is initially generated, the hearing time is longer than a critical time based on the user hearing activity monitoring, or the frequency in which a user manually manipulates a critical volume is more than a critical value. Further, regarding the measuring range of the listening information, whether some or all of the frequencies are measured to monitor any hearing-impairment may also be determined.

When the measuring range of the listening information is determined at S1120, the sensing of the brainwave data may be determined at S1130.

When the sensing of the brainwave data is determined to be performed at S1130 ("Y" path), the measuring of the listening information may be performed by using the brainwave data at S1140.

For example, a hearing stimulus signal for left ear and right ear at a high frequency (e.g., more than 4 kHz) and a test signal at three frequencies may be outputted. Further, the brainwave ASSR may be measured based on the brainwave data responding to the test signal. Thereafter, the listening information (e.g., left/right ear audiograms) by repeating the processes such as reproducing a subsequent set of audio data, outputting the hearing stimulus signal, measuring the brainwave ASSR, and reproducing the subsequent set of audio data.

When the sensing of the brainwave data is determined not to be performed at S1130 ("N" path), manual measurement of the listening information may be performed at S1150.

Specifically, when the sound outputting apparatus 200 does not include a sensor to measure brainwave data or when a sound outputting apparatus 200 is not currently used, sensing may be determined not to be performed.

For example, the hearing stimulus signal regarding the left ear and the right ear at a high frequency (e.g., more than 4 kHz) and the test signal regarding three frequencies may be outputted, and the test signal in which a user manually input may be received.

In this case, when a user hears the test signal, the test signal may be a user input such as a specific input on the sound outputting apparatus 200 like a headphone/earphone (e.g., a button input, head nodding (EMG sensor), and voice recognizing), a specific input on the electronic apparatus 100 of FIG. 1 such as a smart phone/tablet (e.g., screen touching, button input, specific motion inputting such as shaking, and voice inputting), or a specific input on the electronic apparatus 100 such as a smart watch (e.g., hand motion inputting (EMG sensor), button inputting, and voice inputting).

Thereafter, the listening information (e.g., left/right ear audiogram) may be generated by repeating the above-identified processes such as reproducing a subsequent set of audio data, outputting the test signal, receiving the inputting signal of a user, and reproducing the subsequent set of audio data.

Figure 12:
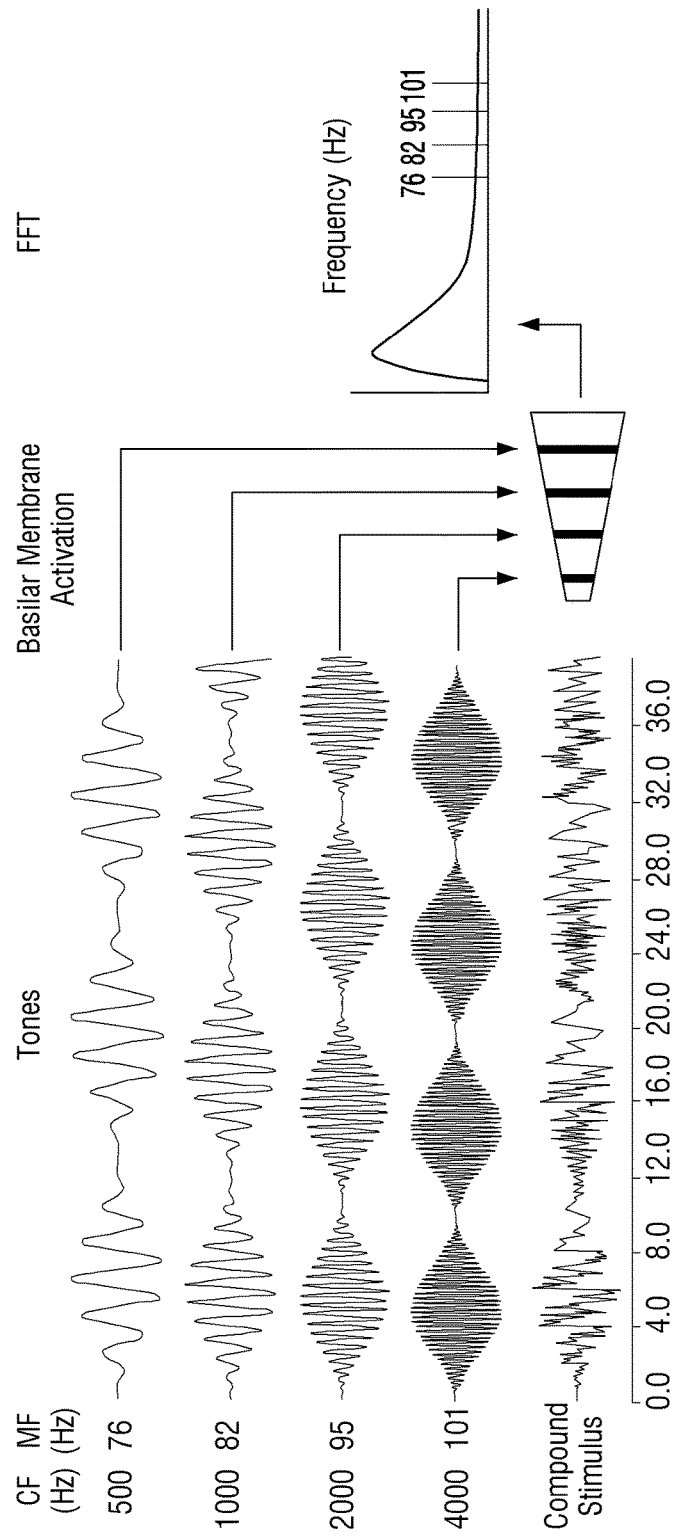
FIG. 12 is a diagram provided to explain a method for analyzing brainwave data according to an embodiment.

FIG. 12 is a diagram provided to explain a method for analyzing the brainwave data according to an embodiment.

Usually, ASSR may be brain potential evoked by the auditory stimulus, and may be used in objectively estimating a hearing characteristic of an individual person.

As illustrated in FIG. 12, the test signal may be tone signal of the specific frequency to be tested such as 500, 1000, 2000, and 4000 Hz. The brainwave data may be detected immediately after the test signals with one or more specific frequencies of the above-identified tone signal have been presented to one or both ears (e.g., at 75 dB sound-pressure-level (SPL) for several dozens of milliseconds). The detected brainwave data may be analyzed with the specific frequencies through a Fast Fourier Transformation (FFT). When the modulation frequency components corresponding to the carrier frequency of the test signal are shown, the each frequency tone signal may be determined to be heard by the user.

The above method can infer behavioral pure-tone audiograms calculated based on the response signal (e.g., button pushing) indicating that a user directly hears the test signal more correctly, conveniently, and quickly. Specifically, the method may save the time by providing several test signals simultaneously compared to providing test signals individually.

FIGS. 13 and 14A through 14D are diagrams provided to explain an exemplary hearing service provided according to various embodiments.

Figure 13:
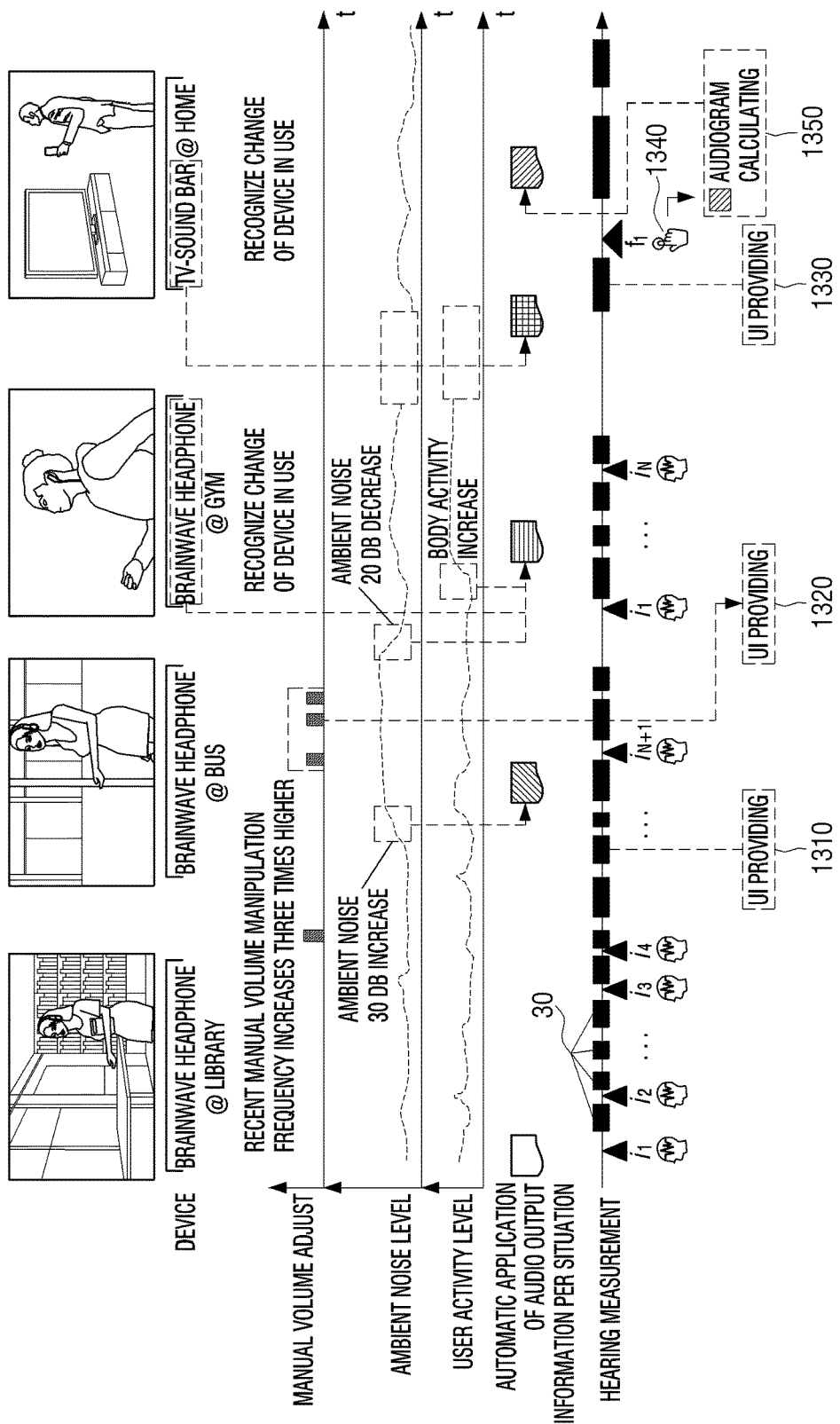
FIGS. 13, 14A through 14D are diagrams provided to explain an example of the hearing service provided according to various embodiments.

Referring to FIG. 13, various information services related with the current listening information of a user may be provided.

Figure 14A:
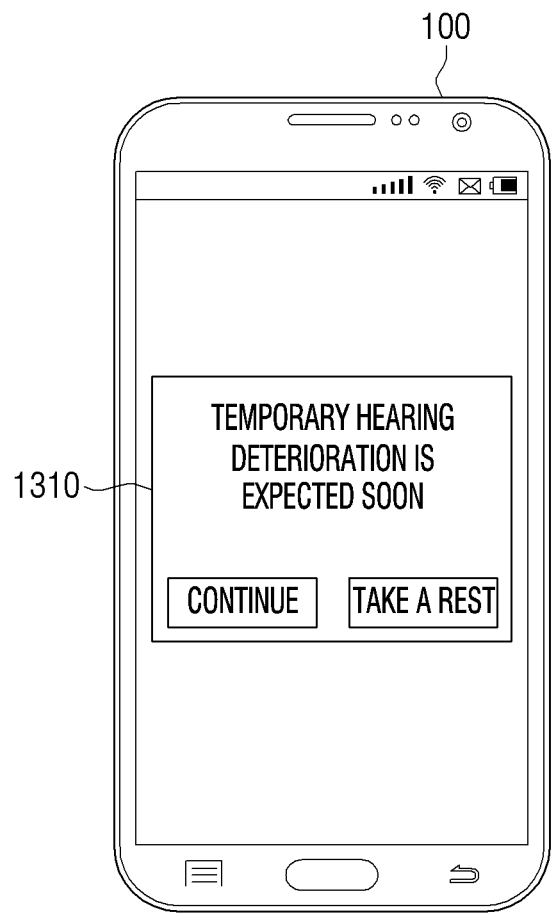

For example, as a result of measuring the hearing characteristic of a user, the electronic apparatus 100 may provide a UI 1310 to present an exemplary notice when temporary hearing deterioration of a user is expected. FIG. 14A illustrates an exemplary UI. The screen of the electronic apparatus 100 may present via the UI 1310 a UI guide stating that "The temporary hearing deterioration is expected soon", and a plurality of UI selections (e.g., "listen" and "rest") for selection by a user.

Figure 14B:
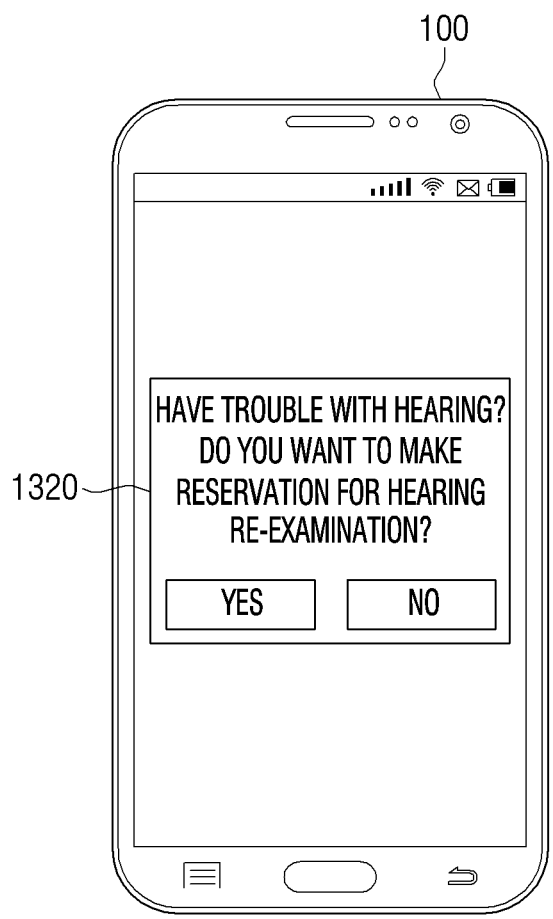
Figure 14C:
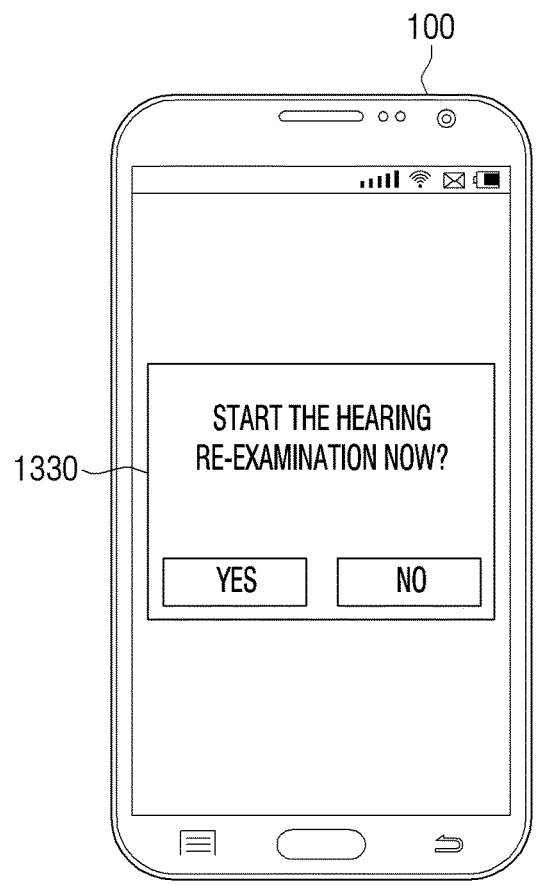

Further, as shown in FIG. 14B, when the hearing of a user is requested to be re-measured based on how frequent a volume is manually manipulated, the electronic apparatus 100 may provide a UI 1320 to confirm a reservation of hearing re-examination. In FIG. 14C, the electronic apparatus 100 may provide a UI 1330 to confirm a start of the hearing re-examination according to the reservation. UIs in illustrated formats may also be provided.

Figure 14D:
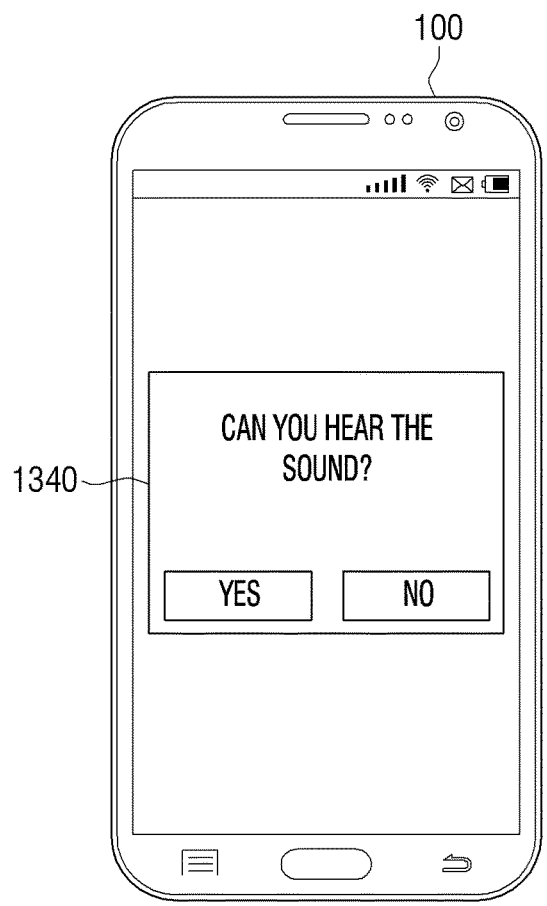

Further, when the listening information of a user is measured based on a user input instead of the brainwave data, the electronic apparatus 100 may provide UI 1340 to request a user input. FIG. 14D illustrates an example of the corresponding UI. UI in an illustrated format may also be provided.

Meanwhile, as shown in FIG. 14C, when a user joins in the hearing re-examination by selecting "YES", the electronic apparatus 100 may re-calculate the listening information of a user (e.g., a user audiogram) through the hearing re-examination as illustrated in FIG. 14B.

Figure 15:
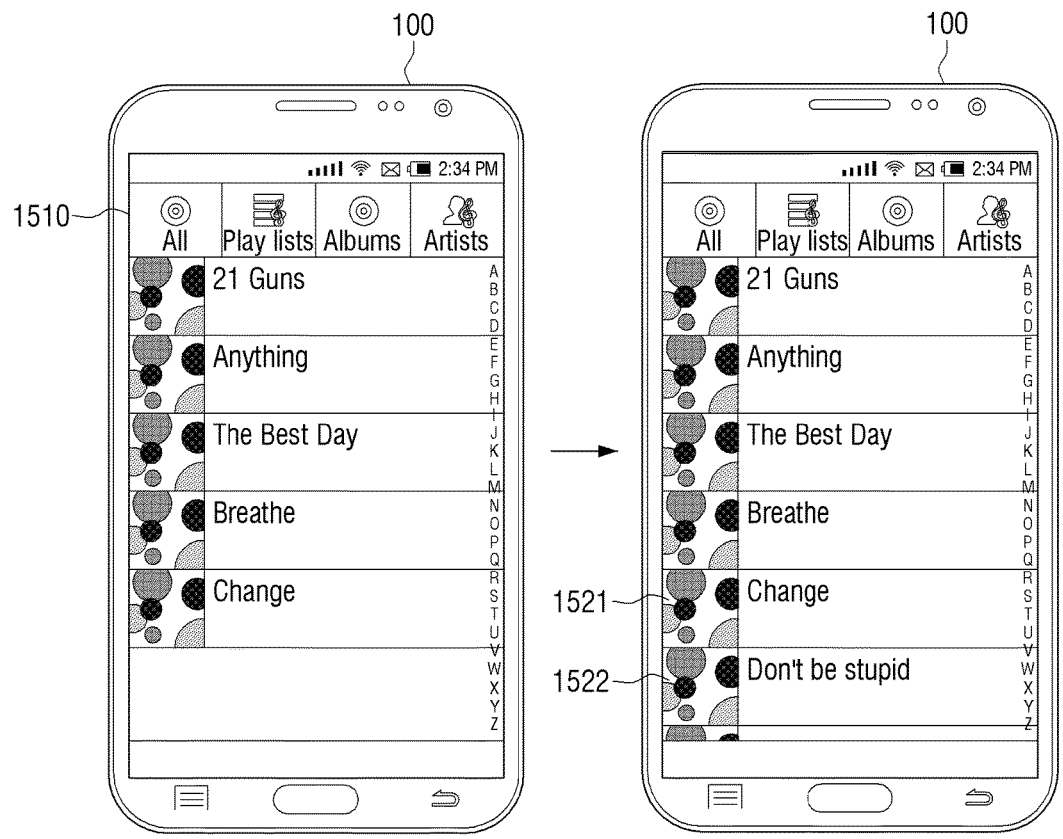
FIG. 15 is a diagram provided to explain a method for managing the audio data according to an embodiment.

FIG. 15 is a diagram provided to explain a method for managing audio data according to an embodiment.

According to an embodiment, the electronic apparatus 100 may automatically manage the audio data based on the brainwave data of a user measured during a reproduction of the audio data.

For example, as illustrated in FIG. 15, the electronic apparatus 100 may automatically add or categorize similar audio data into the same genre or the same pattern. For example, electronic apparatus 100 may automatically add or categorize audio data for "Don't be stupid," 1522 to a playlist when it is determined that the user likes the audio data of "Change" 1521 by measuring the brainwave data of a user.

Further, when a user shows a negative preference on specific audio data via measured brainwave data, the electronic apparatus 100 may delete the corresponding audio data or insert the audio data in the same genre or the same pattern to the corresponding audio data among the audio data included in one of a plurality of playlists.

However, the above is merely one of a plurality of embodiments; the audio data management may be performed with various methods. For example, the electronic apparatus 100 may manage the audio data preferred by a user as a separate list, or suggest the audio data in the same genre or the same pattern to the audio data having a high preference shown by a user to a user.

Figure 16A:
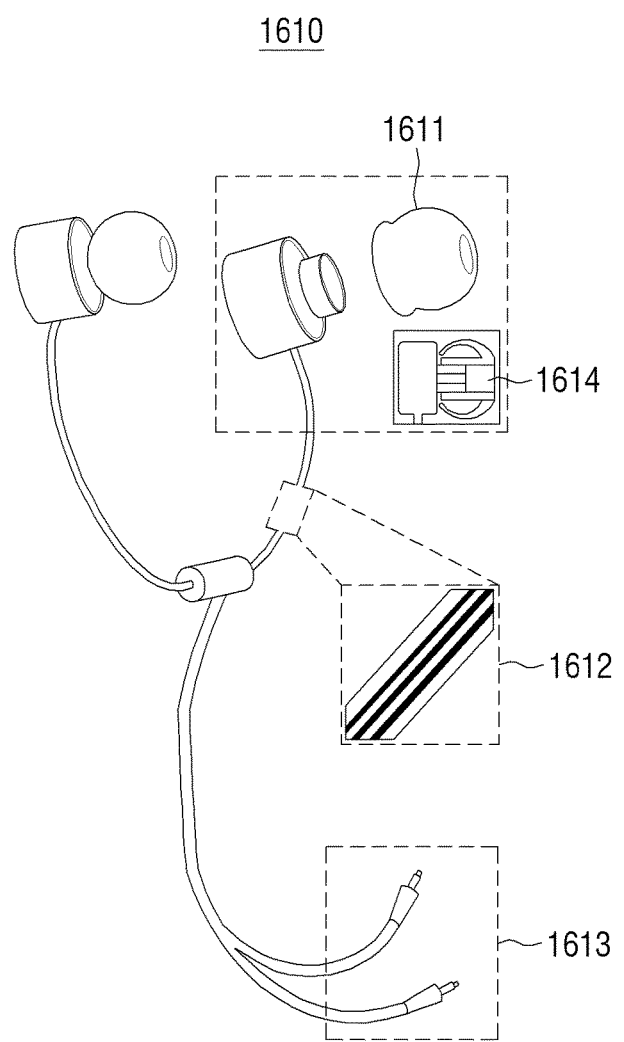
FIGS. 16A through 16C are diagrams provided to explain the implementation of the sound outputting apparatus according to various embodiments.
Figure 16B:
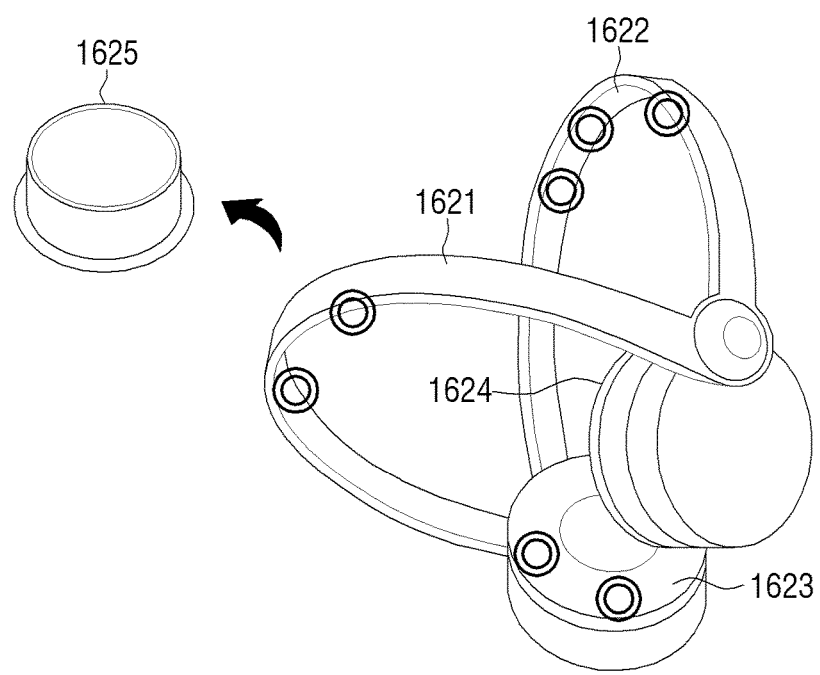
Figure 16C:
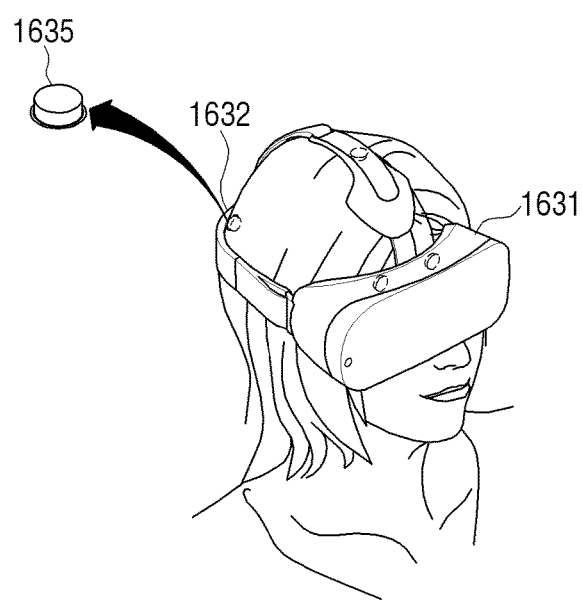

FIGS. 16A to 16C are diagrams provided to explain implementing formats of the sound outputting apparatus 200 according to various embodiments.

According to an embodiment, the sound outputting apparatus 200 may be implemented as a device that can be worn by the user. For example, the sound outputting apparatus 200 may be implemented as an earphone, a headphone or a HMD (Head Mounted Display) device that can be positioned around the head of a user.

In this case, the sound outputting apparatus 200 may measure the brainwave data of a user via his/her brow(s), head skin, or other body parts using at least one dry/wet/semi-dry type electrodes. Herein, the electrodes to measure the brainwave data may be implemented integrally with the sound outputting apparatus 200. However, according to cases, the electrodes may be implemented on a foam tip that can be detached and attached to the earphone or the headphone or the HMD device.

For example, when the sound outputting apparatus 200 may be implemented as an earphone 1610, electrodes 1614 for measuring the brainwave data may be implemented in a micro-electrode format positioned on an earphone tip 1611 to be inserted into the user's ear(s), as illustrated in FIG. 16A. Meanwhile, earphone line 1612 may include a plurality of signal lines that may be used to communicate sounds indicative of the audio data and/or the brainwave data to the user, and plugs 1613 connects the earphone line 1612 to the electronic apparatus 100.

Further, when the sound outputting apparatus 200 is implemented as a headphone set 1620, electrodes 1625 may be implemented as supporters 1621, 1622 connecting two speakers of the headphone set 1620, and/or as ear contacting pads 1623, 1624 of the two speakers as illustrated in FIG. 16B. Meanwhile, the supporters 1621, 1622 of the headphone set 1620 may be moveable so as to measure the brainwave data of the user at a plurality of positions. In some embodiments, the supporters 1621, 1622 may be implemented as parts of a head band. Meanwhile, although FIG. 16B illustrates that the sound outputting apparatus 200 includes two supporters 1621, 1622, the sound outputting apparatus 200 may include one supporter in other embodiments.

Further, when the sound outputting apparatus 200 is implemented as a HMD device 1630, as illustrated in FIG. 16C, the electrode 1635 may be implemented in a form such that the electrode 1635 may be attached to a main frame 1631 where the electronic apparatus 100 is mounted, or be attached to a mount 1632 configured to be connected to the main frame 1631 and fix the main frame 1631 onto a part of a user's body. Meanwhile, while FIG. 16C exemplifies a plurality of mounts 1632, in other embodiments, only one mount may be implemented.

According to another embodiment, the sound outputting apparatus 200 may be implemented as other devices, such as, for example, portable phone speaker, home built speaker, sound bar, home theater, and car speaker. In this case, electrodes (such as the electrodes 1614) for measuring the brainwave data may be implemented as a separate brainwave measuring device connected to the sound outputting apparatus 200. For example, when the sound outputting apparatus 200 is implemented as sound bar and car speaker, the electrodes for measuring the brainwave may be provided on the separated brainwave measuring device.

According to the above various embodiments, a user can be provided with improved or optimized hearing experience via the corresponding apparatus without specifically and/or manually manipulating the sound outputting apparatus 200.

Specifically, a user may be provided with the improved or optimized hearing experience for the listening situation by modifying and providing the output state of the audio data based on user dimension, work, exercises, and recognition state etc. through analyzing the listening environment. Further, even when a user wears the corresponding apparatus without considering the directions of the left ear and the right ear differently from the corresponding sound outputting apparatuses 200, noise-induced hearing impair may be efficiently minimized or prevented with a proper volume level according to the hearing level.

Meanwhile, although the above embodiment describes that the electronic apparatus 100 generates the audio output information, and controls the output state of the audio data based on the audio output information; this is merely one of embodiments.

In some embodiments, a server may perform some or all functions of the electronic apparatus 100. In some other embodiments, the sound outputting apparatus 200 may perform may perform some or all functions of the electronic apparatus 100.

The following will generally explain a method in which a server performs the above-described functions of the electronic apparatus 100.

Figure 17:
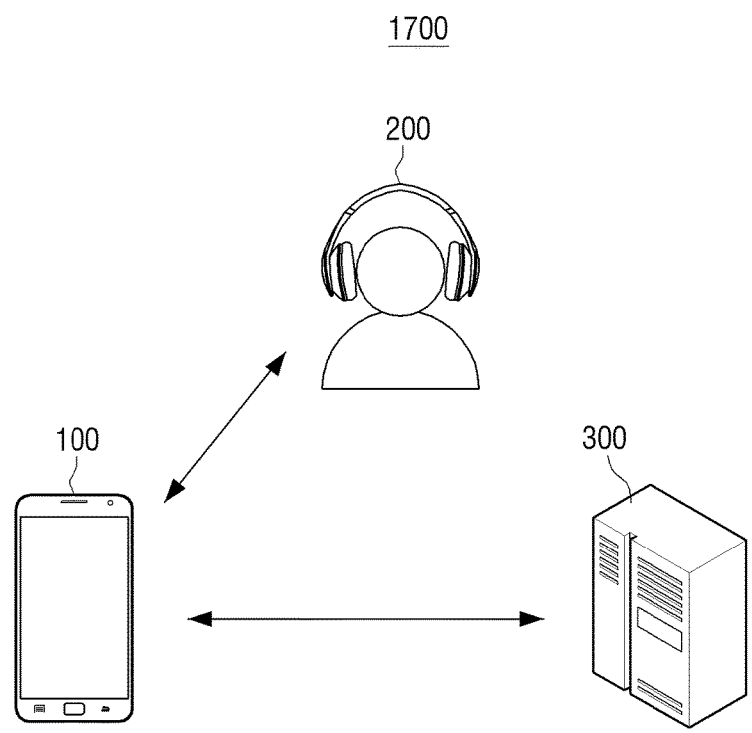
FIGS. 17 through 23 are diagrams provided to explain the electronic system according to various embodiments.

FIG. 17 is a diagram of an electronic system 1700 according to an embodiment, wherein like numerals refer to like parts.

Referring to FIG. 17, the electronic system 1700 according to an embodiment may include the electronic apparatus 100, the sound outputting apparatus 200, and a server 300.

Meanwhile, the electronic system in FIG. 17 is similar to the electronic system 90 of FIG. 1 except that the server 300 may generate audio data.

The electronic apparatus 100 may detect the situation data of a user, and transmit the detected situation data to the server 300. Further, the electronic apparatus 100 may transmit the brainwave data received from the sound outputting apparatus 200 to the server 300.

For the above, the electronic apparatus 100 may include components as illustrated in FIGS. 2A and 2B, and may be implemented to perform some or all functions of the electronic apparatus 100 in FIG. 1.

The communicator 110 (of FIGS. 2A and 2B) may communicate with the server 300. Specifically, the communicator 110 may communicate with the server 300 and transmit situation data and brainwave data of a user to the server 300.

In this case, the communicator 110 may communicate with the server 300 according to various methods.

For example, the communicator 110 may communicate with the server 200 through Wi-Fi, $3^{rd}$ generation (3G), $3^{rd}$ Generation Partnership Project (3GPP), and Long Term Evolution (LTE).

The processor 130 (of FIGS. 2A and 2B) may control the communicator 110 to transmit the situation data of a user detected by the detector 120 (of FIGS. 2A and 2B) and the brainwave data of a user received from the sound outputting apparatus 200 to the server 300, modify and transmit the output state of the audio data based on the audio output information to the sound outputting apparatus 200 when the audio output information is received from the server 300.

The server 300 may generate and store the audio output information based on the situation data and the brainwave data received from the electronic apparatus 100, and transmit to the electronic apparatus 100.

Figure 18:
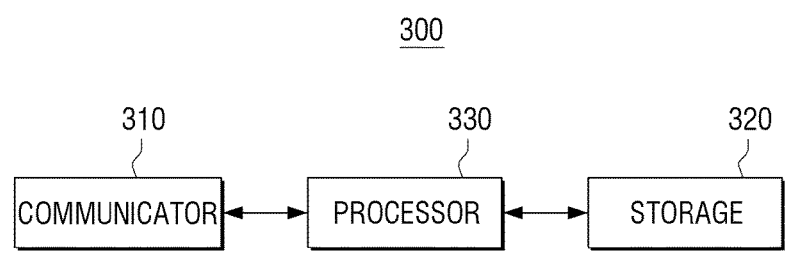

For the above, the server 300 may include a communicator 310, a storage 320, and a processor 330 as illustrated in FIG. 18.

The communicator 310 may communicate with the electronic apparatus 100. Specifically, the communicator 310 may communicate with the electronic apparatus 100, receive the situation data and the brainwave data of a user, and transmit the audio output information to the electronic apparatus 100.

In this case, the communicator 310 may communicate with the electronic apparatus 100 according to various methods.

For example, the communicator 310 may communicate with the electronic apparatus 100 through the various communication methods such as Wi-Fi, 3G, 3GPP, and LTE.

The storage 320 may store various pieces of information. Specifically, the storage 320 may store the audio output information per listening situation.

The processor 330 may control general operation of the server 300.

Specifically, the processor 330 may control generating audio output information per listening situation based on at least one among the situation data and the brainwave data of a user, and the storing in the storage 320. Further, the processor 330 may control transmitting the audio output information suitable for the listening situation of a user to the electronic apparatus 100.

Meanwhile, the method for generating the audio output information is already described above.

Figure 19A:
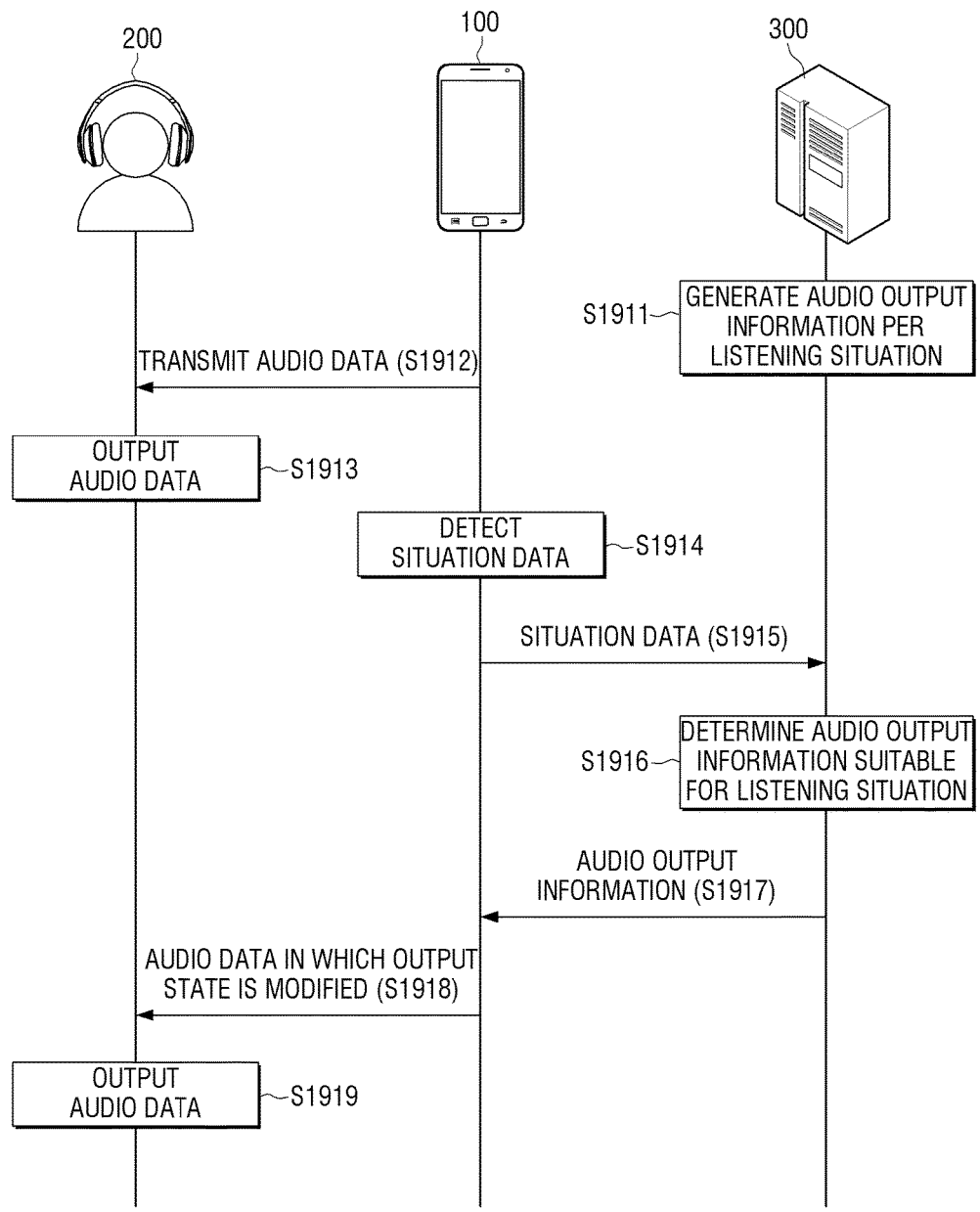
Figure 19B:
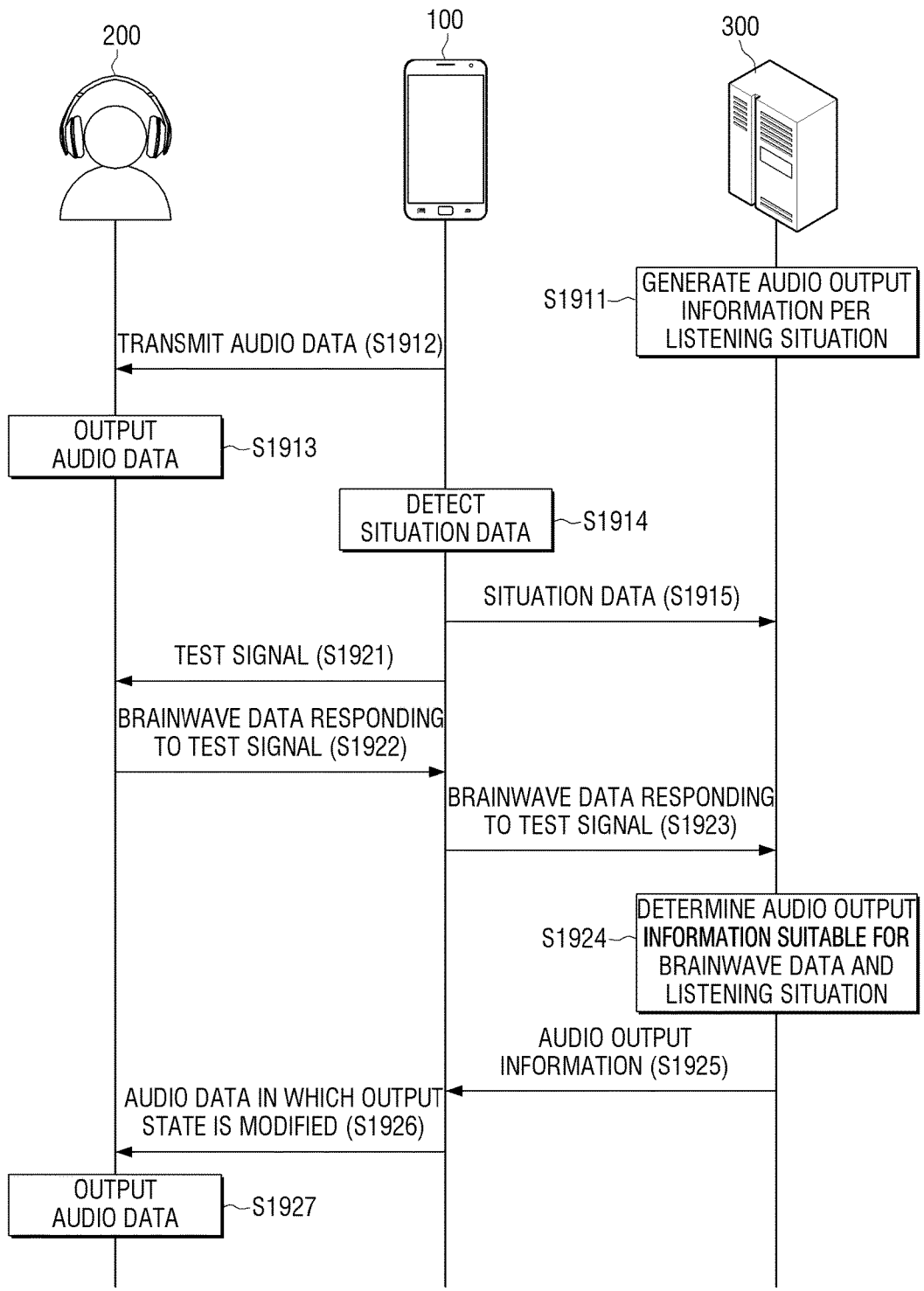

FIGS. 19A and 19B are sequence diagrams provided to explain the operation of the electronic apparatus 100 (of FIG. 17), the sound outputting apparatus 200 (of FIG. 17), and the server 300 (of FIG. 17) according to an embodiment.

Referring to FIG. 19A, the server 300 may generate and store the audio output information per listening situation at S1911.

Thereafter, the electronic apparatus 100 may reproduce the audio data and transmit to the sound outputting apparatus 200 at S1912, and the sound outputting apparatus 200 may output sounds indicative of the audio data received from the electronic apparatus 100 at S1913.

The electronic apparatus 100 may detect the situation data of a user at S1914, and transmit the detected situation data to the server 300 at S1915.

In this case, the server 300 may determine the listening situation of a user based on the situation data, determine the audio output information suitable for the listening situation at S1916, and transmit the audio output information to the electronic apparatus 100 at S1917.

Thereafter, the electronic apparatus 100 may modify the output state of the audio data based on the audio output information, and transmit the audio data in which the output state is modified to the sound outputting apparatus 200 at S1918. The sound outputting apparatus 200 may output sounds indicative of the audio data received from the electronic apparatus 100 at S1919.

FIG. 19B includes steps similar to S1911 to S1915 of FIG. 19A.

However, the electronic apparatus 100 may transmit the test signal to the sound outputting apparatus 200, and the sound outputting apparatus 200 may transmit the brainwave data responding to the test signal to the electronic apparatus 100 at S1922.

At S1923, the electronic apparatus 100 may transmit the brainwave data received from the sound outputting apparatus 200 to the server 300.

The server 300 may determine the audio output information suitable for the brainwave data and the listening situation at S1924, and transmit the audio output information to the electronic apparatus 100 at S1925.

Therefore, the electronic apparatus 100 may modify the output state of the audio data based on the audio output information and transmit the audio data in which the output state is modified to the sound outputting apparatus 200 at S1926. The sound outputting apparatus 200 may output sounds indicative of the audio data received from the electronic apparatus 100 at S1927.

Figure 20:
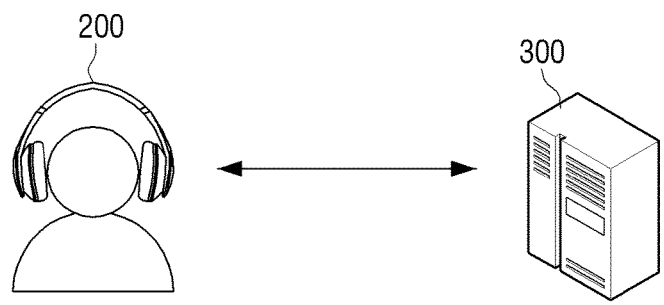

FIG. 20 is a diagram of an electronic system 2000 according to an embodiment.

Referring to FIG. 20, the electronic system according to an embodiment may include the sound outputting apparatus 200 and the server 300.

Meanwhile, the electronic system in FIG. 20 is similar to the electronic apparatus 100 of FIG. 17 except that the sound outputting apparatus 200 performs some or all functions of the electronic apparatus 100 of FIG. 17.

The sound outputting apparatus 200 may detect the situation data and the brainwave data of a user, and transmit the detected situation data and brainwave data to the server 300.

For the above, the sound outputting apparatus 200 may be similar the sound outputting apparatus 200 of FIG. 3, and may be implemented to additionally detect the situation data.

The communicator 210 of FIG. 3 may communicate with the server 300. Specifically, the communicator 210 may communicate with the server 300, and transmit the situation data and the brainwave data of a user to the server 300.

In this case, the communicator 210 may communicate with the server 300 according to various methods.

For example, the communicator 210 may communicate with the server 300 according to various communication methods such as Wi-Fi, 3G, 3GPP, and LTE.

The sensor 230 of FIG. 3 may detect the situation data of a user. In this case, the sensor 230 may detect the situation data of a user using similar methods as discussed above with respect to the detector 120 of FIG. 2A.

The processor 240 of FIG. 3 may control the communicator 210 to transmit the situation data and the brainwave data of a user detected by the sensor 230 to the server 300, modify and output the output state of the audio data based on the audio output information when the audio output information is received from the server 300.

Meanwhile, the method for modifying the output state of the audio data is already described above.

Figure 21:
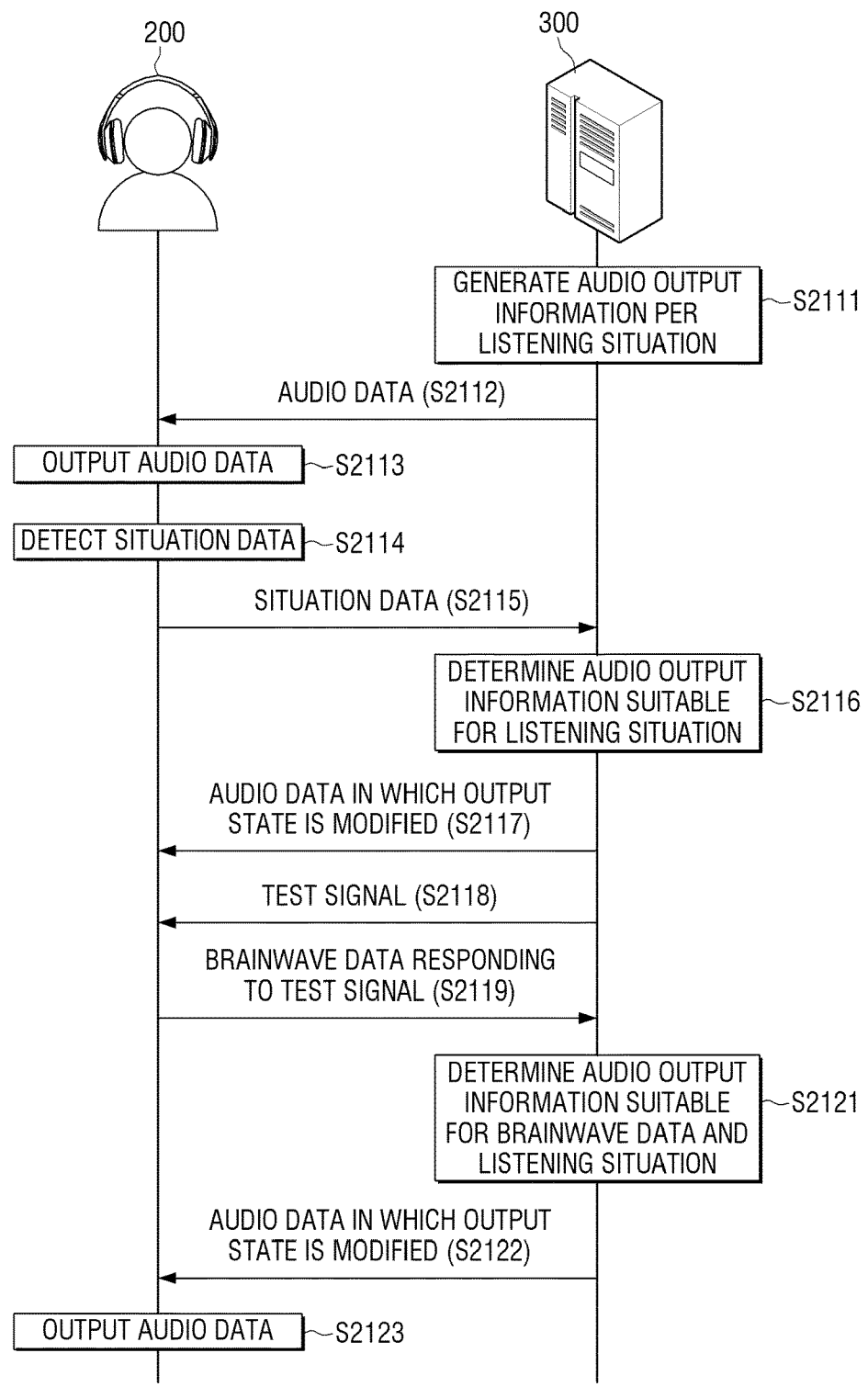

FIG. 21 is a sequence diagram provided to explain the operation of the sound outputting apparatus and the server according to an embodiment.

Referring to FIG. 21, the server 300 may generate and store the audio output information per listening situation at S2111.

Thereafter, the server 300 may transmit the audio data to the sound outputting apparatus 200 at S2112, and the sound outputting apparatus 200 may output sounds indicative of the audio data received from the server 300 at S2113.

The sound outputting apparatus 200 may detect the situation data of a user at S2114, and transmit the detected situation data to the server 300 at S2115.

In this case, the server 300 may determine the listening situation of a user based on the situation data and determine the audio output information suitable for the listening situation at S2116. Further, the server 300 may modify and transmit the output state of the audio data based on the audio output information to the sound outputting apparatus 200 at S2117.

The server 300 may transmit the test signal to the sound outputting apparatus 200 at S2118, and the sound outputting apparatus 200 may transmit the brainwave data responding to the test signal to the sound outputting apparatus 200 at S2119.

Thereby, the server 300 may determine the audio output information suitable for the brainwave data and the listening situation at S2121.

Further, the server 300 may modify the output state of the audio data based on the audio output information and transmit the audio data in which the output state is modified to the sound outputting apparatus 200 at S2122. The sound outputting apparatus 200 may output sounds indicative of the audio data received from the server 300 at S2123.

Figure 22:
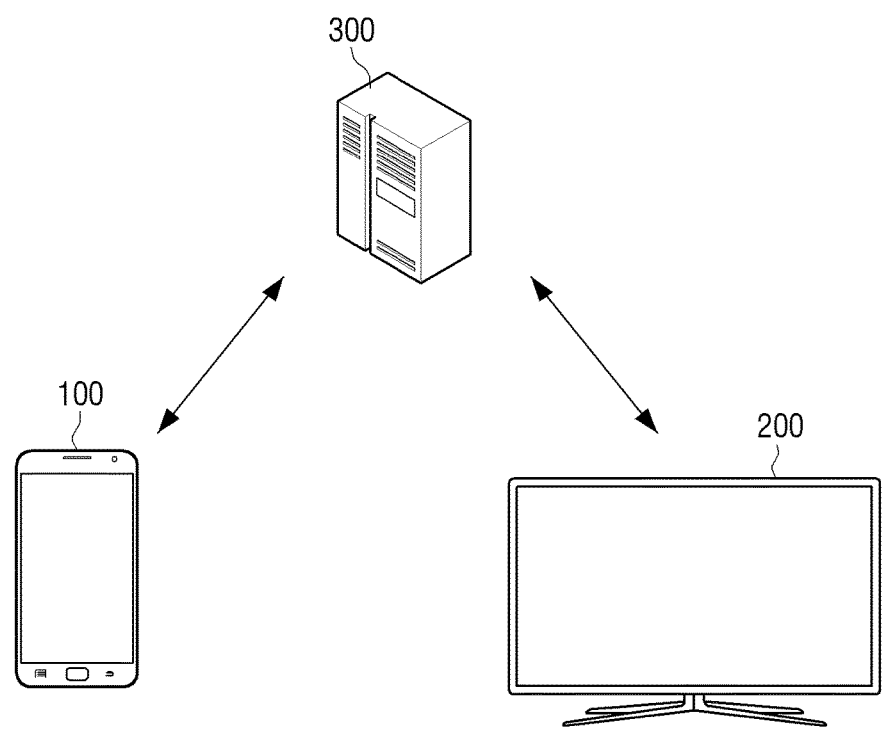

FIG. 22 is a diagram of an electronic system 2200 according to an embodiment.

Referring to FIG. 22, the electronic system 2200 according to an embodiment may include the sound outputting apparatus 200 and the server 300.

Meanwhile, the electronic system in FIG. 22 is similar to the electronic system 1700 in FIG. 17 except that the sound outputting apparatus 200 performs some or all functions performed by the electronic apparatus 100.

The electronic apparatus 100 may detect the situation data of a user, and transmit the detected situation data to the server 300. Further, the electronic apparatus 100 may transmit the user input responding to the test signal (e.g., user manipulation to input manually) to the server 300.

The server 300 may generate and store the audio output information based on the situation data and the user input received from the electronic apparatus 100, and transmit to the sound outputting apparatus 200.

For the above, the server 300 may include the communicator 310, the storage 320 and the processor 330 as illustrated in FIG. 18.

The communicator 310 may communicate with the sound outputting apparatus 200. Specifically, the communicator 310 may communicate with the sound outputting apparatus 200, and transmit the audio output information to the sound outputting apparatus 200.

In this case, the communicator 310 may communicate with the sound outputting apparatus 200 according to the various methods. For example, the communicator 310 may communicate with the sound outputting apparatus 200 through the various communication methods such as Wi-Fi, 3G, 3GPP, and LTE.

The processor 330 may control the transmitting the audio output information determined based on the user input responding to the listening situation of a user and the test signal to the sound outputting apparatus 200.

Meanwhile, the sound outputting apparatus 200 may modify and output sounds indicative of the output state of the audio data based on the audio output information received from the server 300.

Figure 23:
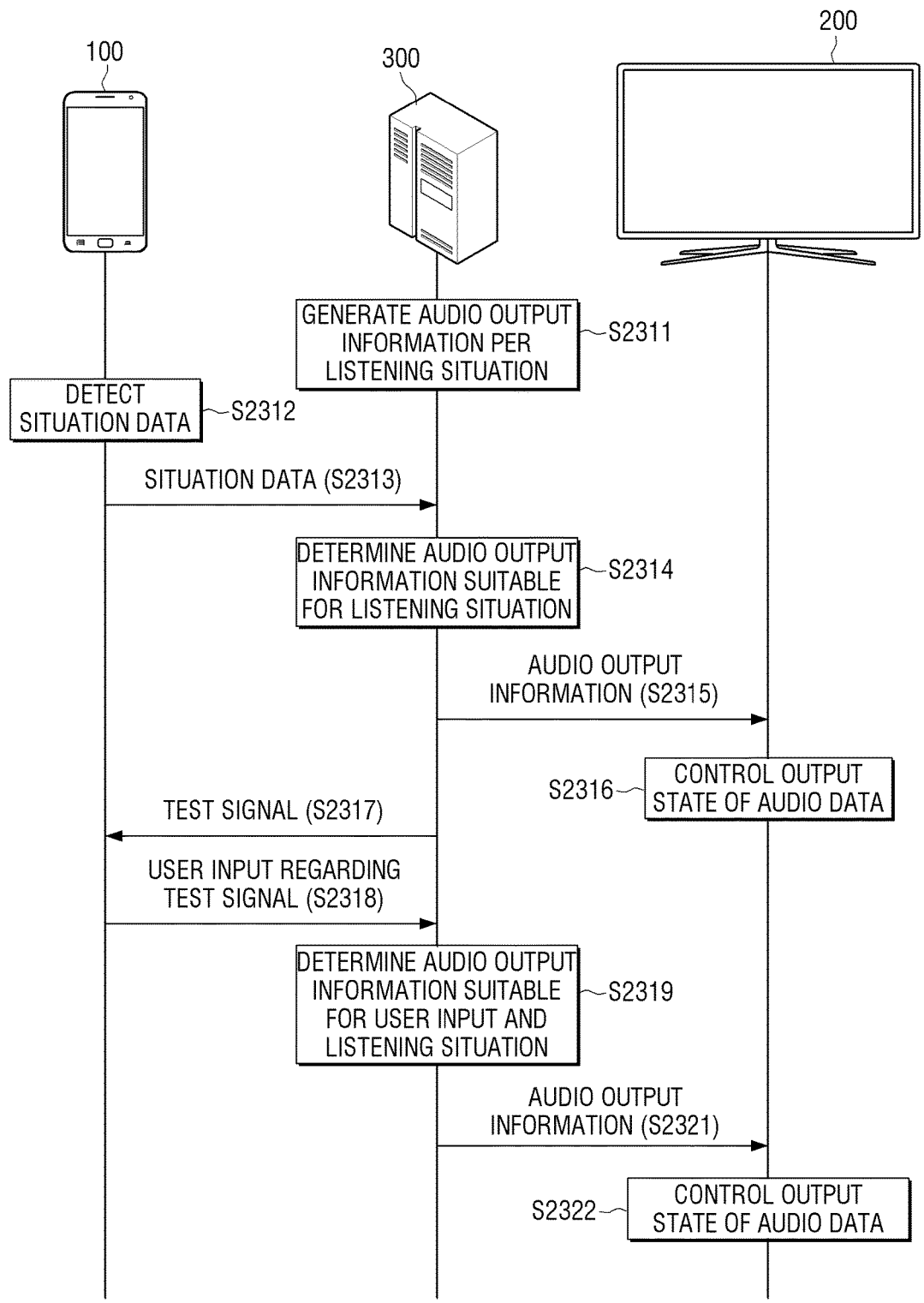

FIG. 23 is a sequence diagram provided to explain the operation of the sound outputting apparatus and the server according to an embodiment.

Referring to FIG. 23, the server 300 may generate and store the audio output information per listening situation at S2311.

The electronic apparatus 100 may detect the situation data of a user at S2312, and transmit the detected situation data to the server 300 at S2313.

In this case, the server 300 may determine the listening situation of a user based on the situation data, determine the audio output information suitable for the listening situation at S2314, and transmit the audio output information to the sound outputting apparatus 200 at S2315.

The sound outputting apparatus 200 may modify and output sounds indicative of the output state of the audio data based on the audio output information received from the server 300 at S2316.

Meanwhile, the server may transmit the test signal to the electronic apparatus 100 at S2317, and the electronic apparatus 100 may transmit the user input responding to the test signal to the server 300 at S2318.

Further, the server 300 may determine the audio output information suitable for the user input and the listening situation at S2319, and transmit the audio output information to the sound outputting apparatus 200 at S2321.

Therefore, the sound outputting apparatus 200 may modify and generate sounds indicative of the output state of the audio data based on the audio output information received from the server 300 at S2322.

Figure 24:
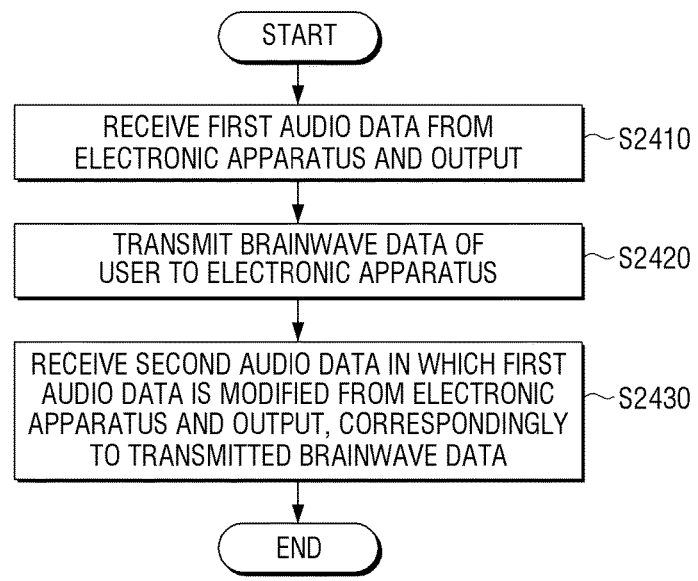
FIG. 24 is a flowchart provided to explain a control method of the sound outputting apparatus according to an embodiment.

FIG. 24 is a flowchart provided to explain a control method of the sound outputting apparatus according to an embodiment.

At S2410, the first audio data may be received from the electronic apparatus and outputted.

At S2420, the brainwave data of a user may be transmitted to the electronic apparatus.

At S2430, in response to the transmitted brainwave data, second audio data, which is modified data of the first audio data, may be received from the electronic apparatus and outputted.

In this case, the electronic apparatus may modify the first audio data into the second audio data according to the audio output information modified correspondingly to listening information determined based on the brainwave data of a user and the listening situation of a user, and transmit to the sound outputting apparatus 200, for example, of FIG. 1.

Herein, the audio output information may include information regarding at least one among an equalizer, a volume and a recommended time for continued listening.

Meanwhile, when the test signal is received from the electronic apparatus 100, for example, of FIG. 1, at S2420, the test signal may be outputted and the brainwave data responding to the test signal may be transmitted to the electronic apparatus 100, for example, of FIG. 1.

Figure 25:
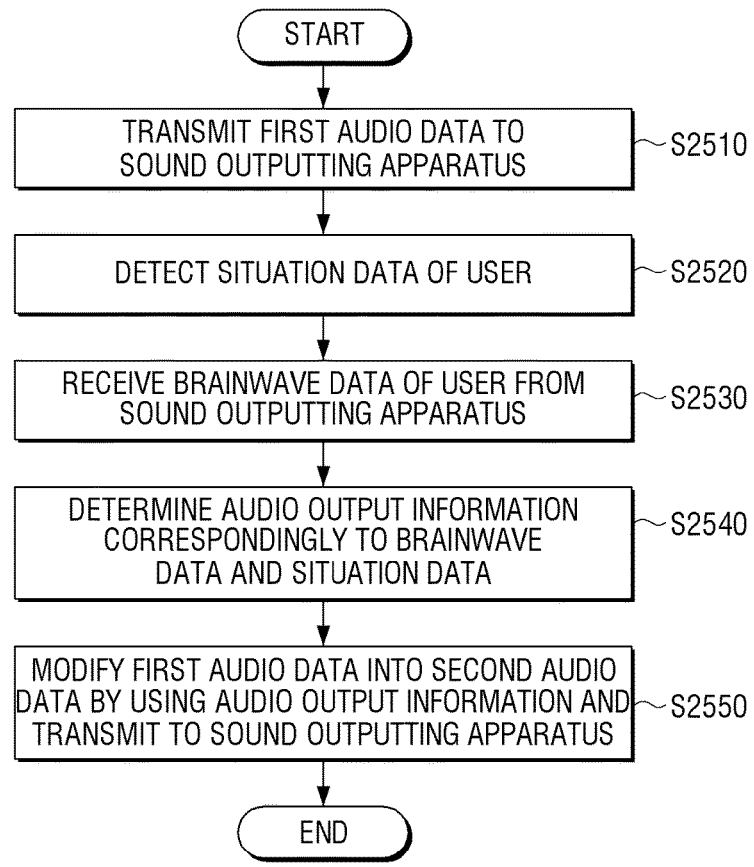
FIG. 25 is a flowchart provided to explain a control method of the electronic apparatus according to an embodiment.

FIG. 25 is a flowchart provided to explain the control method of the electronic apparatus 100, for example, of FIG. 1, according to an embodiment.

At S2510, the first audio data may be transmitted to the sound outputting apparatus 200, for example, of FIG. 1.

The situation data of a user may be detected at S2520, and the brainwave data of a user may be received from the sound outputting apparatus 200, for example, of FIG. 1, at S2530.

Further, the audio output information may be determined correspondingly to brainwave data and the situation data at S2540, and the first audio data may be modified into the second audio data using the audio output information, and the second audio data may be transmitted to the sound outputting apparatus 200, for example, of FIG. 1, at S2550.

Herein, the audio output information may include information regarding at least one among an equalizer, a volume and a recommended time for continued listening.

Meanwhile, at S2550, the first audio data may be modified into the first audio data by using the audio output information determined correspondingly to listening information of a user based on the brainwave data of a user and the listening situation of a user based on the situation data of a user.

Herein, the listening situation may include at least one among the surrounding environment situation of a user, an activity situation that a user engages in, and a type of sound outputting apparatus.

Further, the listening information of a user may include the hearing characteristic of a user and the hearing sensitivity of a user. The hearing characteristic of a user may include at least one among the audible range of a user, the hearing level respectively regarding the left and the right ear, and the hearing level per frequency. The hearing sensitivity of a user may include at least one among the ambient noise sensitivity, the body activity sensitivity, the temperature sensitivity, the audio data sensitivity and the recognition state sensitivity.

Meanwhile, the control method according to an embodiment may transmit the test signal to the sound outputting apparatus, and obtain the listening information of a user based on the brainwave data responding to the test signal.

Meanwhile, based on an assumption that a user listens to audio data in a variety of situations, a method for changing output state of the audio data will be described below.

According to various embodiments, the sound outputting apparatus 200 may be implemented as a speaker included in a transportation apparatus. The "transportation apparatus" as used herein may be a moving device such as vehicle, airplane, ship, motorcycle, bicycle, train, and so on, with passengers or shipments being on board.

Figure 26A:
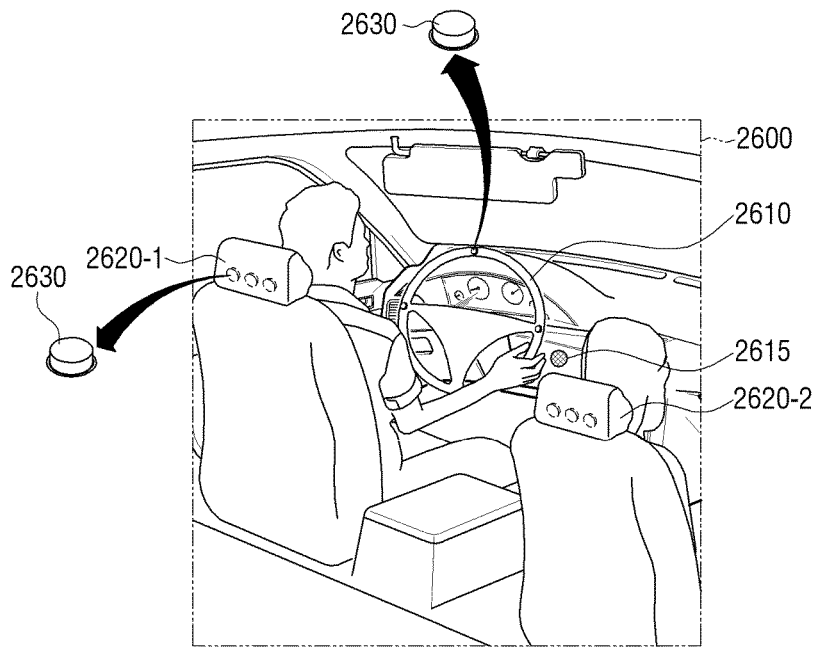
FIG. 26A and FIG. 26B are diagrams provided to explain forms of transportation apparatuses including a sound outputting apparatus and a method for determining audio output information, according to various embodiments.
Figure 26B:
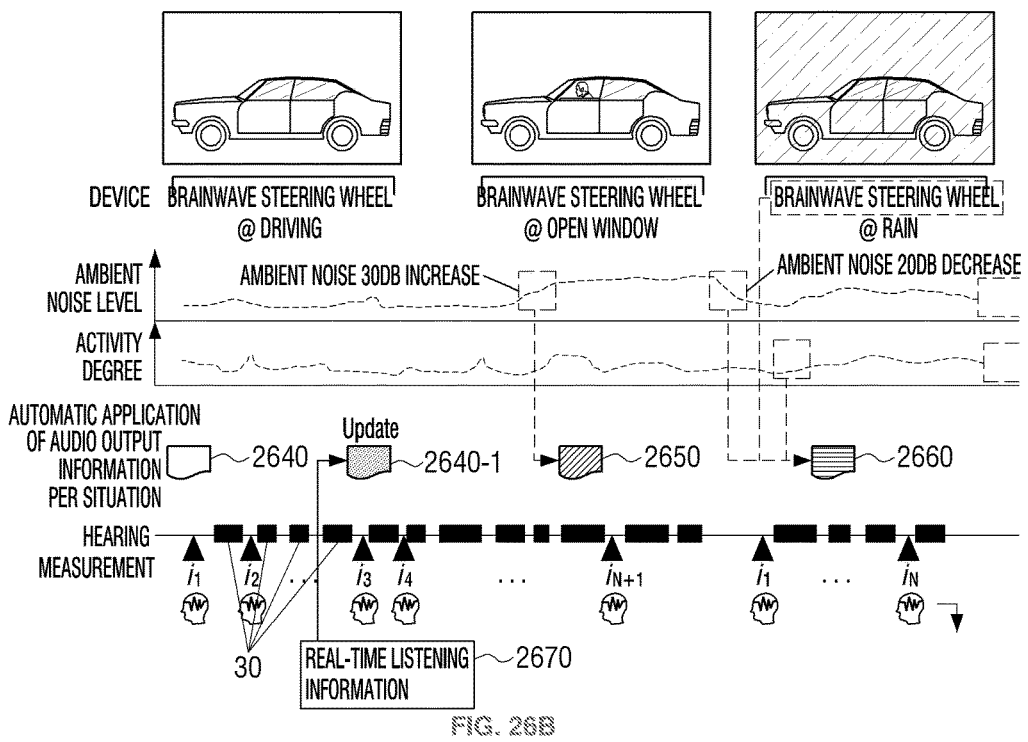

FIG. 26A and FIG. 26B are diagrams provided to explain forms of transportation apparatuses including a sound outputting apparatus and a method for determining audio output information according to various embodiments.

Referring to FIG. 26A, a transportation apparatus 2600 may include constituent elements of FIG. 3. The transportation apparatus 2600 may communicate with the electronic apparatus 100 with the communicator 210 to thus receive audio data and output the same through an output module (e.g., speaker 2615).

According to an embodiment, when the sound outputting apparatus 200 is included in the transportation apparatus 2600, the electrode 2630 for brainwave data measurement may be implemented as a form that is contactable to the user's body. For example, the electrode 2630 for the brainwave data measurement may be implemented in a form such that the electrode 2630 may be mounted on a steering wheel 2610 contactable to the user's hand, mounted on a headrest 2620 contactable to a user's neck, and so on. In these examples, the transportation apparatus 2600 may measure the user's brainwave data from hand, back of neck, or other body parts with at least one dry-, wet- or semidry-type electrode.

For example, when the electrode 2630 for brainwave data measurement is included in the steering wheel 2610, the steering wheel may include a plurality of electrodes 2630. When the electrode 2630 for brainwave data measurement is built in the steering wheel 2610, unnecessary noise may be generated due to a distance between measuring location and the user's brain. In this case, the processor 240 may additionally include software to extract only the necessary brainwaves from the measured data in order to enhance accuracy of the brainwave measurement.

According to various embodiments, the electrode 2630 for brainwave data measurement may be mounted on headrests 2620-1, 2620-2 that support the user's head. The headrests 2620-1, 2620-2 may be brought into contact with the neck of a driver or a passenger to measure the brainwaves. In this example, the processor 240 may distinguish brainwaves of the driver from those of the passenger to thus control the output module 2615 of the vehicle according to respective situations.

The electronic apparatus 100 may determine listening situation of the user, based on the situation data received from the transportation apparatus 2600 or the situation data sensed through a variety of sensors provided on the electronic apparatus.

For example, as illustrated in FIG. 26B, the electronic apparatus 100 may determine that the current listening situation corresponds to a listening situation with low noise and very low amount of activity, based on the situation data received during a listening situation in which the user is driving the transportation apparatus 2600.

The electronic apparatus 100 may determine the audio output information 2640 corresponding to the listening situation with low noise and very low amount of activity, reproduce the audio data with output state changed according to such audio output information, and transmit the result to the output module 2615 of the transportation apparatus.

Next, as illustrated in FIG. 26B, the electronic apparatus 100 may provide a test signal $(i_1, \ldots i_{N+1})$ between the audio data 30.

The electronic apparatus 100 may then acquire the real-time hearing ability information 2670 by determining the user's hearing ability information based on the brainwave data that responds to the test signal. The hearing ability information 2670 may include at least one of the user's hearing characteristic and hearing sensitivity described above.

Next, based on the user's hearing ability information acquired, the electronic apparatus 100 may update the audio output information 2640, change the output state of the audio data based on the updated audio output information 2640-1, and reproduce the audio data accordingly.

Even after this, the electronic apparatus 100 may again determine the audio output information 2650, 2660 based on the user's hearing ability information according to the brainwave data, change the output state of the audio data based on the audio output information 2650, 2660, and reproduce the audio data accordingly.

It is possible that, even after this, the electronic apparatus 100 may again determine the audio output information 2650, 2660 based on the user's hearing ability information according to the brainwave data, change the output state of the audio data based on the audio output information 2650, 2660, and reproduce the audio data accordingly.

The electronic apparatus 100 may change the output state of the audio data and reproduce the audio data by using not only the brainwave data of the driver of the transportation apparatus 2600, but also the brainwave data of the passenger. Alternatively, the electronic apparatus 100 may reproduce the audio data while varying the output states of the output module adjacent to the driver and the output module adjacent to the passenger from each other.

According to various embodiments, the processor 240 of the transportation apparatus 2600 may control a variety of constituent elements of the transportation apparatus 2600 based on a variety of information acquired at the sensor 230 or the detector 120 of the electronic apparatus 100.

For example, the processor 240 may control the heating apparatus, hot wire coil at steering wheel, hot wire coil at seats, seat ventilation, display brightness, and so on of the transportation apparatus 2600.

Specifically, when the user opens window while driving, the processor 240 may stop the operation of the air conditioner and control the brightness of a display (not illustrated) included in the transportation apparatus 2600 to a brighter degree. Further, the processor 240 may respond to noises that may enter from outside by increasing the volume of the audio data.

When it rains while the user is driving, the processor 240 may drive the hot wire coils at the seats or the steering wheel, and may respond to a situation with increased noise due to sound of rains by increasing the sound level of the audio data, although exemplary embodiments are not limited thereto. For example, while the sound level may be adjusted in consideration of the user convenience as described above, the sound level may also be adjusted in consideration of safe driving of the transportation apparatus 2600.

Specifically, when the speed of the transportation apparatus 2600 increases higher than a preset level, the sound level of an alarm sound associated with the driving of the vehicle may be increased. And when the speed of the transportation apparatus 2600 is lower than the preset level, the sound level of the alarm sound associated with the driving of the vehicle may be generated at a lowered sound level.

As described above, the processor 240 may control a variety of operations of the transportation apparatus 2600 based on the information collected through the sensor 230 or the detector 120 of the electronic apparatus 100.

According to various embodiments, the sound outputting apparatus 200 may be implemented as a headphone included in a medical apparatus. For example, the medical apparatus may be an apparatus such as a magnetic resonance imaging (MRI) system that measures biometric state of an object.

Figure 27:
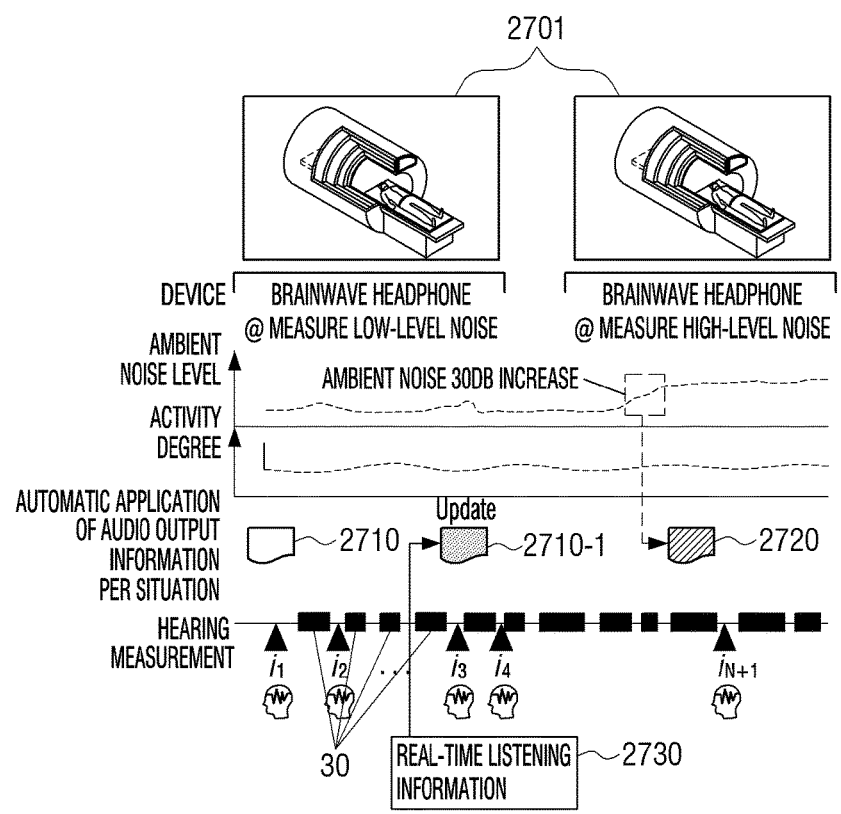
FIG. 27 is a diagram provided to explain a method for determining audio output information at a medical device including a sound outputting apparatus according to various embodiments.

FIG. 27 is a diagram provided to explain a method for determining audio output information at a medical apparatus including a sound outputting apparatus according to various embodiments. Referring to FIG. 27, the MRI system 2701 may include the constituent elements of FIG. 3. Meanwhile, the MRI system 2701 may include various sensors (not illustrated) for sensing environments surrounding the MRI system 2701.

The processor 240 may output the audio data corresponding to the audio output information determined based on the sensed situation data to a headphone (not illustrated) mounted on a head of an object in need of measurement. The headphone (not illustrated) may be implemented as the headphone 1620 of FIG. 16B.

For example, the processor 240 may detect the situation data for use in determining the hearing situation of the user through various sensors. For example, based on the situation data received in a situation that the object is being under examination, the processor 240 may determine that the current hearing situation of the object corresponds to a low-noise measuring section with a very low amount of activity. The "object" herein refers to a subject of photography and may include human, animal or a portion thereof. For example, the object may include bodily parts (e.g., organs) or phantom, and so on.

The processor 240 may determine the audio output information 2710 corresponding to the hearing situation with a very low amount of activity of the object, reproduce the audio data with changed output state according to the audio output information, and transmit the audio data to the headphone (not illustrated). Further, the processor 240 may drive a noise removal algorithm in low-noise situation such that the noise is removed from the audio data and the noise-free audio data may be transmitted to the headphone (not illustrated).

Next, as illustrated in FIG. 27, the MRI system 2701 may provide the test signal ($i_1, \ldots i_{N+1}$) between the audio data 30.

The processor 240 may then acquire the real-time hearing ability information 2730 by determining the hearing ability information of the user based on the brainwave data that responds to the test signal. The hearing ability information 2730 herein may include at least one of hearing characteristic and hearing sensitivity of the user described above. For example, the processor 240 may acquire the real-time hearing ability information 2730 by reflecting changes in the brainwave data of the object according to examination conducted for a long time.

The processor 240 may then update the audio output information 2710 based on the acquired hearing ability information of the user, change the output state of the audio data based on the updated output information 2710-1, and reproduce the audio data accordingly.

Even after this, the processor 240 may again determine the audio output information 2720 based on the brainwave data-based hearing ability information of the user and based on a situation with increased noise level, change the output state of the audio data based on the audio output information 2720, and reproduce the audio data accordingly. Further, when in high-noise state, the processor 240 may drive a noise removal algorithm to thus remove noise and transmit the noise-free audio data to the headphone (not illustrated).

Meanwhile, a non-transitory computer readable medium in which a program sequentially executing the various methods described above may be stored may be provided according to an exemplary embodiment. The non-transitory computer readable medium is not a medium that stores data therein for a while, such as a register, a cache, a memory, or the like, but means a medium that at least semi-permanently stores data therein and is readable by a device such as a microprocessor. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

At least one of the components, elements, modules or units represented by a block as illustrated in FIGS. 2, 3, 18 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

Further, the foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A sound outputting apparatus, comprising:
a communicator configured to communicate with an electronic apparatus;
an output module;
a sensor configured to detect brainwave data of a user; and
a processor configured to control:
the output module to output a first audio data in response to the first audio data being received from the electronic apparatus,
the communicator to transmit the brainwave data of the user detected through the sensor to the electronic apparatus, and
in response to a second audio data, which is modified data of the first audio data, being received from the electronic apparatus, the output module to output the second audio data, wherein:
the first audio data is modified to the second audio data according to audio output information determined based on listening situation information of the user and hearing ability information of the user based on the brainwave data of the user, and
the listening situation information of the user comprises at least one of information related with a listening place where the user listens to the first audio data, information related to actions performed by the user while listening to the first audio data, and information related to a type of the sound outputting apparatus.

2. The sound outputting apparatus of claim 1, wherein the electronic apparatus modifies the first audio data into the second audio data according to the audio output information based on the hearing ability information determined from the brainwave data of the user and the situation information of the user, and transmits the second audio data to the sound outputting apparatus.

3. The sound outputting apparatus of claim 2, wherein the audio output information comprises information regarding at least one of an equalizer, a volume and a recommended time for continued listening.

4. The sound outputting apparatus of claim 1, wherein, when a test signal is received from the electronic apparatus, the processor outputs the test signal, and transmits the brainwave data responding to the test signal to the electronic apparatus.

5. An electronic apparatus, comprising:
a communicator configured to communicate with a sound outputting apparatus;
a detector configured to detect situation data of a user; and
a processor configured to:
transmit a first audio data to the sound outputting apparatus;
receive brainwave data of the user from the sound outputting apparatus;
determine hearing ability information of the user based on the received brainwave data of the user;
determine listening situation information of the user based on the detected situation data of the user;
modify the first audio data into a second audio data by using audio output information determined based on the hearing ability information of the user and the listening situation information of the user; and
transmit the second audio data to the sound outputting apparatus,
wherein the listening situation information of the user comprises at least one of information related with a listening place where the user listens to the first audio data, information related to actions performed by the user while listening to the first audio data, and information related to a type of the sound outputting apparatus.

6. The electronic apparatus of claim 5, wherein the audio output information comprises information regarding at least one of an equalizer, a volume, and a recommended time for continued listening.

7. The electronic apparatus of claim 5, wherein:
the hearing ability information of the user comprises a hearing characteristic of the user and a hearing sensitivity of the user,
the hearing characteristic of the user comprises an audible range of the user, a hearing level respectively regarding left ear and right ear, and a hearing level per frequency, and
the hearing sensitivity of the user comprises at least one of an ambient noise sensitivity, a body activity sensitivity, a temperature sensitivity, an audio data sensitivity, and a recognition state sensitivity.

8. The electronic apparatus of claim 5, wherein the processor transmits a test signal to the sound outputting apparatus, and obtains the hearing ability information of the user based on the brainwave data responding to the test signal.

9. An electronic system comprising an electronic apparatus and a sound outputting apparatus, comprising:
the sound outputting apparatus configured to:
receive a first audio data from the electronic apparatus,
output the first audio data,
detect brainwave data of a user,
transmit the detected brainwave data of the user to the electronic apparatus, and
in response to a second audio data, which is modified data of the first audio data, being received from the electronic apparatus, output the second audio data; and
the electronic apparatus configured to:
receive brainwave data of the user from the sound outputting apparatus,
detect situation data of the user,
determine hearing ability information of the user based on the received brainwave data of the user,
determine listening situation information of the user based on the detected situation data of the user,
modify the first audio data into the second audio data by using audio output information determined based on the listening situation information of the user and the hearing ability information of the user, and
transmit the second audio data to the sound outputting apparatus,
wherein the listening situation information of the user comprises at least one of information related with a listening place where the user listens to the first audio data, information related to actions performed by the user while listening to the first audio data, and information related to a type of the sound outputting apparatus.

* * * * *